(12) United States Patent
Fujii et al.

(10) Patent No.: US 9,718,166 B2
(45) Date of Patent: Aug. 1, 2017

(54) WATER JET PEENING APPARATUS AND METHOD, AND METHOD OF EVALUATING NOZZLE

(71) Applicant: MITSUBISHI HEAVY INDUSTRIES, LTD., Tokyo (JP)

(72) Inventors: Motoyuki Fujii, Tokyo (JP); Takanori Arai, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 14/594,827

(22) Filed: Jan. 12, 2015

(65) Prior Publication Data

US 2015/0231762 A1 Aug. 20, 2015

(30) Foreign Application Priority Data

Jan. 15, 2014 (JP) ................. 2014-005257

(51) Int. Cl.
| | | |
|---|---|---|
| *B24C 5/04* | (2006.01) | |
| *B24C 1/10* | (2006.01) | |
| *B24C 3/32* | (2006.01) | |
| *G21C 19/00* | (2006.01) | |

(52) U.S. Cl.
CPC .......... *B24C 5/04* (2013.01); *B24C 1/10* (2013.01); *B24C 3/325* (2013.01); *G21C 19/00* (2013.01)

(58) Field of Classification Search
CPC .... C21D 7/06; B24C 1/10; B24C 3/32; G01H 3/04; B21D 31/06
USPC ............................................................ 72/53
See application file for complete search history.

(56) References Cited

U.S. PATENT DOCUMENTS

| | | | | |
|---|---|---|---|---|
| 8,387,427 | B2 * | 3/2013 | Matsui .......... | C21D 7/06 72/53 |
| 2011/0097972 | A1 * | 4/2011 | Suzuki .......... | B24C 1/10 451/8 |
| 2013/0220841 | A1 * | 8/2013 | Yang .......... | A45C 11/00 206/37 |

FOREIGN PATENT DOCUMENTS

| | | |
|---|---|---|
| JP | 2006-300640 A | 11/2006 |
| JP | 2012-148374 A | 8/2012 |

* cited by examiner

*Primary Examiner* — Debra Sullivan
(74) *Attorney, Agent, or Firm* — Birch, Stewart, Kolasch & Birch, LLP

(57) ABSTRACT

A water jet peening apparatus includes: a nozzle, which is arranged in water and has a mouth from which water is jetted out; a detecting device, which is arranged in the water and detects sound in at least a part of a period during which the water is being jetted out from the mouth; and a processing device, which determines, based on a result of the detection by the detecting device, presence or absence of abnormality in the nozzle.

23 Claims, 17 Drawing Sheets

WATER JET PEENING APPARATUS AND METHOD, AND METHOD OF EVALUATING NOZZLE

FIELD

The invention relates to a water jet peening apparatus, a water jet peening method, and a method of evaluating a nozzle.

BACKGROUND

For example, when residual stress in welded portions of structures in nuclear reactors, attempts to improve the residual stress water jet peening apparatuses, as disclosed in Patent Literature 1 and Patent Literature 2.

CITATION LIST

Patent Literature

Patent Literature 1: Japanese Patent Application Laid-open No. 2006-300640
Patent Literature 2: Japanese Patent Application Laid-open No. 2012-148374

SUMMARY

Technical Problem

Water jet peening apparatus jets out water (high pressure water) from jet mouths of their nozzles that are arranged in water. By shock waves hitting a target, the residual stress in the target is reduced, the shock waves generated when bubbles included in the water jetted out collapse. If the operation using the water jet peening apparatus is continued in a state where the performance of the nozzle has been degraded, the residual stress on the target to be processed may become unable to be reduced sufficiently.

An object of the present invention is to provide a water jet peening apparatus, a water jet peening method, and a method of evaluating a nozzle, which are able to accurately obtain information related to a state of the nozzle.

Solution to Problem

According to an aspect of the present invention, a water jet peening apparatus includes: a nozzle that is arranged in water and includes a mouth from which water is jetted out; a detecting device that is arranged in the water and detects sound in (at least) a part of a period during which the water is being jetted out from the mouth; and a processing device that determines presence or absence of abnormality in the nozzle based on a result of the detecting device.

According to another aspect of the present invention, a water jet peening method includes: jetting out water from a mouth of a nozzle in a state where the mouth and a target to be processed that are arranged in water are opposite to each other; detecting sound by a detecting device arranged in the water in at least a part of a period during which the water is being jetted out from the mouth; and determining presence or absence of abnormality in the nozzle based on a result of the detection by the detecting device.

According to still another aspect of the present invention, a method of evaluating a nozzle of a water jet peening apparatus having a mouth from which water is able to be jetted out, includes: jetting out water from the mouth of the nozzle in a state where the nozzle is arranged in water; detecting sound by a detecting device arranged in the water in at least a part of a period during which the water is being jetted out from the mouth; and determining presence or absence of abnormality in the nozzle based on a result of the detection by the detecting device.

Advantageous Effects of Invention

According to the present invention, information related to a state of a nozzle is able to be obtained accurately.

DESCRIPTION OF EMBODIMENTS

Hereinafter, embodiments of the present invention will be described with reference to the drawings, but the present invention is not limited to these. Requirements of the respective embodiments described below may be combined with one another as appropriate. Further, some of their components may be not used. Further, the components of the embodiments described below include those easily substitutable by those skilled in the art, or those substantially equivalent thereto.

In the following description, by setting an X-Y-Z orthogonal coordinate system, positional relations among the respective components will be described with reference to this X-Y-Z orthogonal coordinate system. One direction in a horizontal plane will be referred to as "X-axis direction", a direction orthogonal to the X-axis direction in this horizontal plane as "Y-axis direction", and a direction orthogonal to each of the X-axis direction and Y-axis direction (that is, a vertical direction) as "Z-axis direction". Further, a rotational (tilt) direction around the X-axis, Y-axis, and Z-axis will be referred to as "θX-direction", "θY-direction", and "θZ-direction", respectively. The X-Y plane is parallel to the horizontal plane.

First Embodiment

Figure 1:
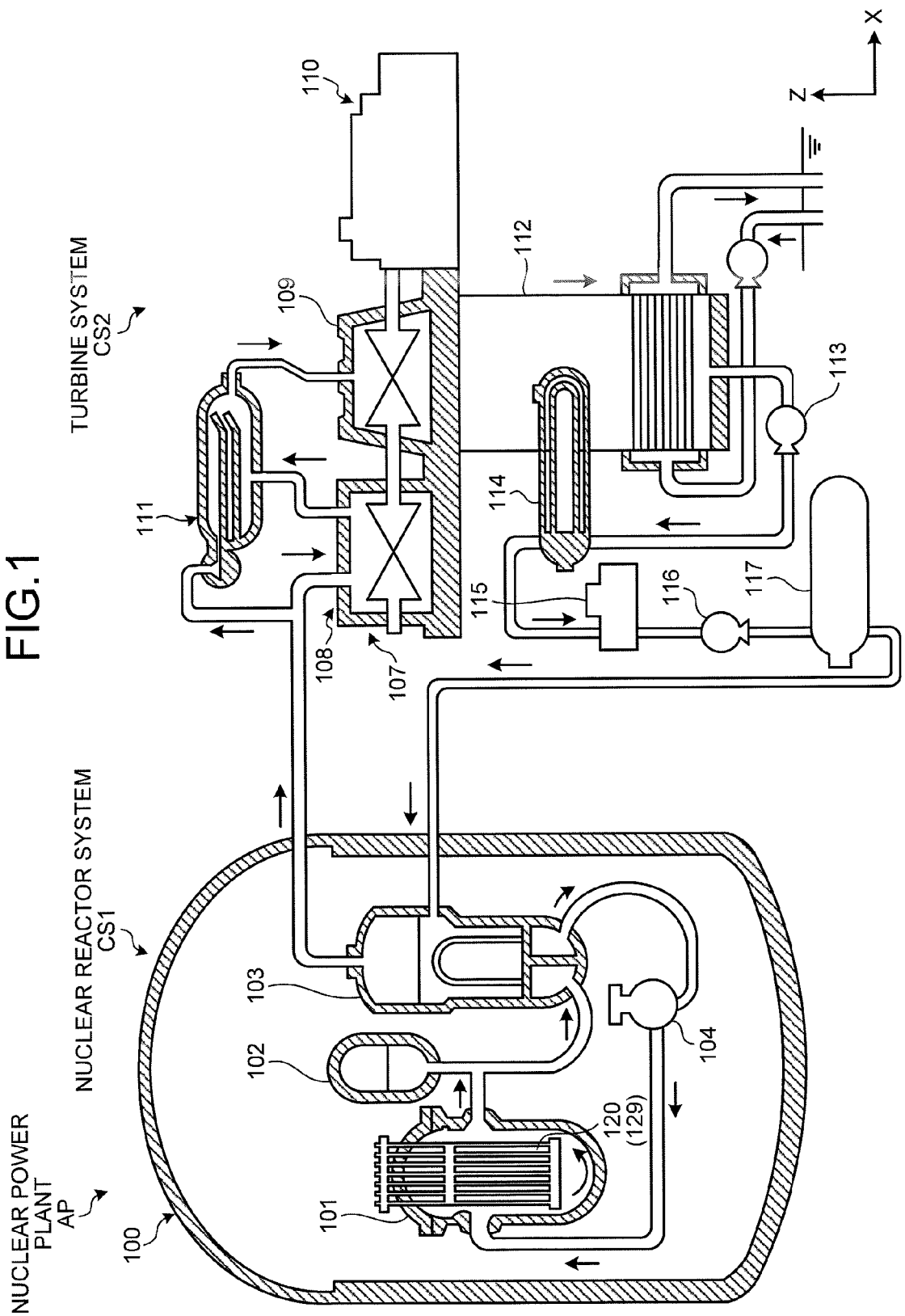
FIG. 1 is a diagram of a schematic configuration of an example of a nuclear power plant according to a first embodiment.

A first embodiment will be described. FIG. 1 is a diagram of a schematic configuration of an example of a nuclear power plant AP according to this embodiment.

As illustrated in FIG. 1, the nuclear power plant AP has a nuclear reactor system CS1 and a turbine system CS2. In this embodiment, the nuclear power plant AP includes a pressurized water reactor (PWR) and has a steam generator 103, which performs heat exchange between high temperature and high pressure primary cooling water generated in the nuclear reactor system CS1 and secondary cooling water that circulates through the turbine system CS2 and generates steam of the secondary cooling water.

The nuclear reactor system CS1 includes a nuclear reactor vessel 101, a pressurizer 102, and a primary cooling water pump 104. Each of the nuclear reactor vessel 101, the pressurizer 102, the steam generator 103, and the primary cooling water pump 104 is stored in a containment 100. The nuclear reactor vessel 101 accommodates therein a reactor core 129 and a fuel assembly 120. The high temperature and high pressure primary cooling water (hot water) heated in the nuclear reactor vessel 101 and pressurized by the pressurizer 102 is fed to the steam generator 103. Low temperature primary cooling water subjected to the heat exchange in the steam generator 103 is fed to the nuclear reactor vessel 101.

The turbine system CS2 includes: a steam turbine 107, which includes a high pressure turbine 108 and a low pressure turbine 109; an electric generator 110, which is driven by the steam turbine 107 and generates electricity; a moisture separator and heater 111; a condenser 112, which cools and liquefy the steam that has worked in the steam turbine 107; a water feed pump 116; a condensate pump 113; a low pressure feed water heater 114; a deaerator 115; and a high pressure feed water heater 117. The steam turbine 107 is operated by the steam fed from the steam generator 103. The condenser 112 cools the steam by using, for example, seawater, to condense the steam into water. The water feed pump 116 operates to feed the secondary cooling water from the condenser 112 to the steam generator 103.

Figure 2:
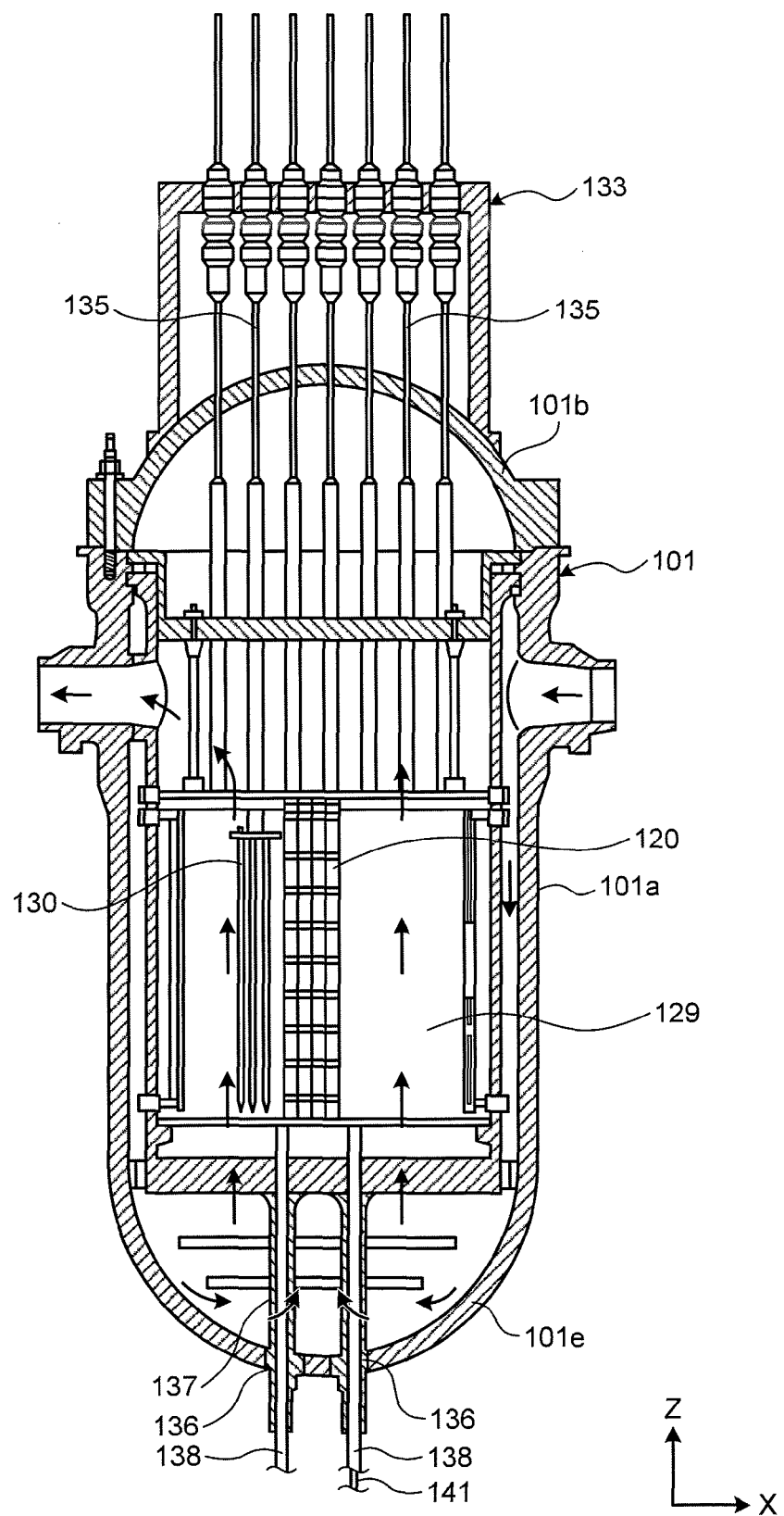
FIG. 2 is a vertical cross section diagram illustrating an example of a nuclear reactor vessel according to the first embodiment.

FIG. 2 is a vertical 1 cross section diagram illustrating what is around the nuclear reactor vessel 101 according to this embodiment. As illustrated in FIG. 2, the nuclear reactor vessel 101 has a vessel main body 101a and a vessel lid 101b. The reactor core 129 is arranged inside the nuclear reactor vessel 101. Inside the reactor core 129, a plurality of the fuel assemblies 120 and a plurality of control rods 130 are arranged. A control rod driving apparatus 133 controls output of the nuclear reactor vessel 101 by moving control rod cluster driving shafts 135 in the vertical direction.

The nuclear reactor vessel 101 has a plurality of instrumentation nozzles 136, which are arranged to penetrate through a bottom head 101e of the vessel main body 101a. Upper end portions of the instrumentation nozzles 136 are arranged inside the nuclear reactor vessel 101 and lower end portions of the instrumentation nozzles 136 are arranged outside the nuclear reactor vessel 101. In-reactor instrumentation guiding pipes 137 are connected to the upper end portions of the instrumentation nozzles 136. Conduit tubes 138 are connected to the lower end portions of the instrumentation nozzles 136.

Thimble tubes 141 are arranged to be insertable to the fuel assemblies 120 via the conduit tubes 138, instrumentation nozzles 136, and in-reactor instrumentation guiding pipes 137. The thimble tube 141 has a neutron flux detector that is able to measure a neutron flux.

The control rod driving apparatus 133 is able to draw out the control rods 130 from the fuel assemblies 120 and insert them into the fuel assemblies 120 by moving the control rod cluster driving shafts 135. The primary cooling water in the nuclear reactor vessel 101 is heated by thermal energy generated by nuclear fission in the reactor core 129 by the control rods 130 being drawn out from the fuel assemblies 120, and the heated primary cooling water is fed to the steam generator 103. Further, by adjusting how much the control rods 130 are inserted into the fuel assemblies 120, the number of neutrons generated in the reactor core 129 is adjusted. Further, by all of the control rods 130 being inserted into the fuel assemblies 120, the nuclear reactor is stopped.

Figure 3:
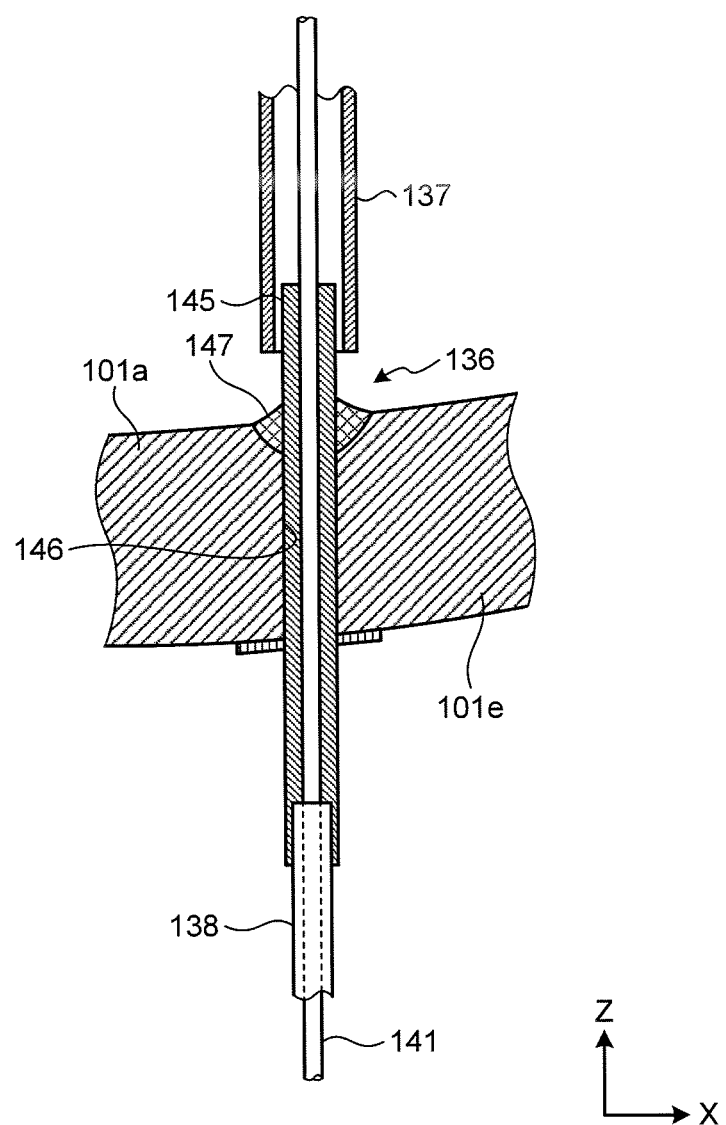
FIG. 3 is a cross section diagram illustrating an example of an instrumentation nozzle of the nuclear reactor vessel according to the first embodiment.

FIG. 3 is a cross section diagram illustrating an example of the instrumentation nozzle 136 according to this embodiment. As illustrated in FIG. 3, the instrumentation nozzle 136 includes an in-reactor instrumentation tube 145 and is arranged in a hole 146 formed in the bottom head 101e of the vessel main body 101a. The instrumentation nozzle 136 is fixed to an inner surface of the bottom head 101e by welding. A welded portion (groove-welded portion) 147 is provided between the instrumentation nozzle 136 and the bottom head 101e.

In this embodiment, the vessel main body 101a includes a low-alloy steel, which is a base material, and a stainless steel, which has been overlay-welded on an inner surface of the low-alloy steel. The in-reactor instrumentation tube 145 is made of a nickel base alloy. In a state where the in-reactor instrumentation tube 145 is arranged in the hole 146, the vessel main body 101a and the in-reactor instrumentation tube 145 are welded together with a material made of a nickel base alloy. Thereby, the welded portion 147 is formed.

By the welding, tensile stress may remain in the instrumentation nozzle 136 (in-reactor instrumentation tube 145), the groove-welded portion 147, and the vessel main body 101a (bottom head 101e) arranged therearound, and as a result, stress corrosion cracking may occur.

In this embodiment, by water jet peening, a surface of the instrumentation nozzle 136 (in-reactor instrumentation tube 145), the groove-welded portion 147, and a surface (inner surface) of the bottom head 101e, which are a target to be processed, are processed such that the residual stress in the target to be processed is relieved and the occurrence of stress corrosion cracking is suppressed.

Water jet peening is a processing method of jetting water (high pressure water) from a mouth of a nozzle arranged in water in a state where a target to be processed, for which the stress thereon is to be improved, is immersed in water. By collapse of bubbles included in the water jetted out from the nozzle, shock waves are generated. By the shock waves hitting the target to be processed that is in water, the residual stress around the surface of the target to be processed is relieved.

That is, when high pressure water including bubbles is jetted out from a nozzle arranged in water, a whirl is generated due to shear force generated at a boundary between still water present around the nozzle and the high pressure water jetted out from the nozzle and a local pressure fluctuation is generated around the whirl. When this happens, bubbles are generated also in a region that is locally caused to be under negative pressure. The bubbles included in the high pressure water at the time the high pressure water is jetted out from the nozzle and the bubbles generated in the water current after the jetting, grow under negative pressure and contract under positive pressure. If the positive pressure is increased further, the bubbles collapse, and shock waves are generated when the bubbles collapse. By shock waves being generated due to cavitation and the shock waves hitting a target to be processed, the residual stress around the surface of the target to be processed is relieved.

Figure 4:
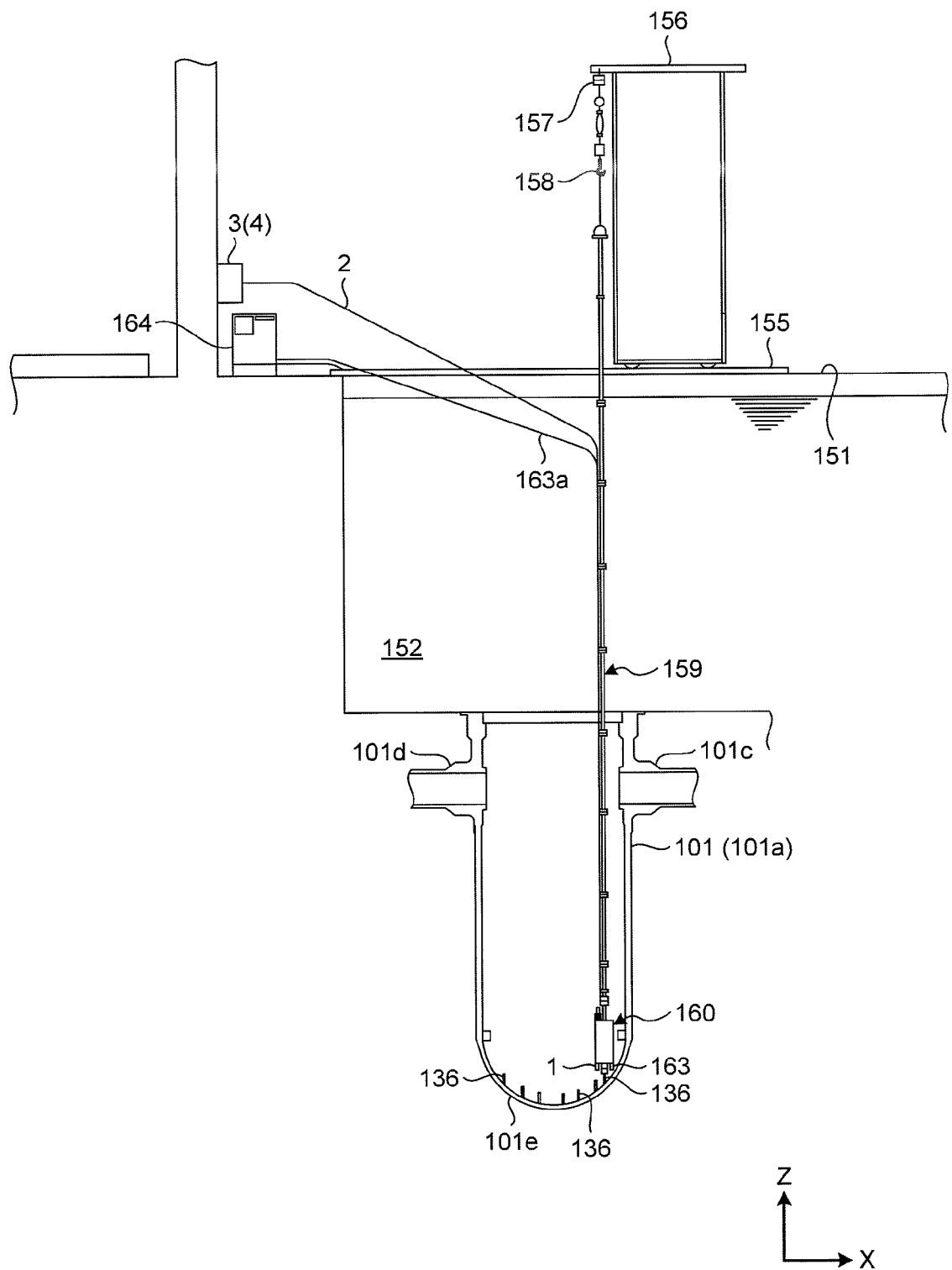
FIG. 4 is a schematic diagram illustrating an installation state of a water jet peening apparatus according to the first embodiment.
Figure 5:
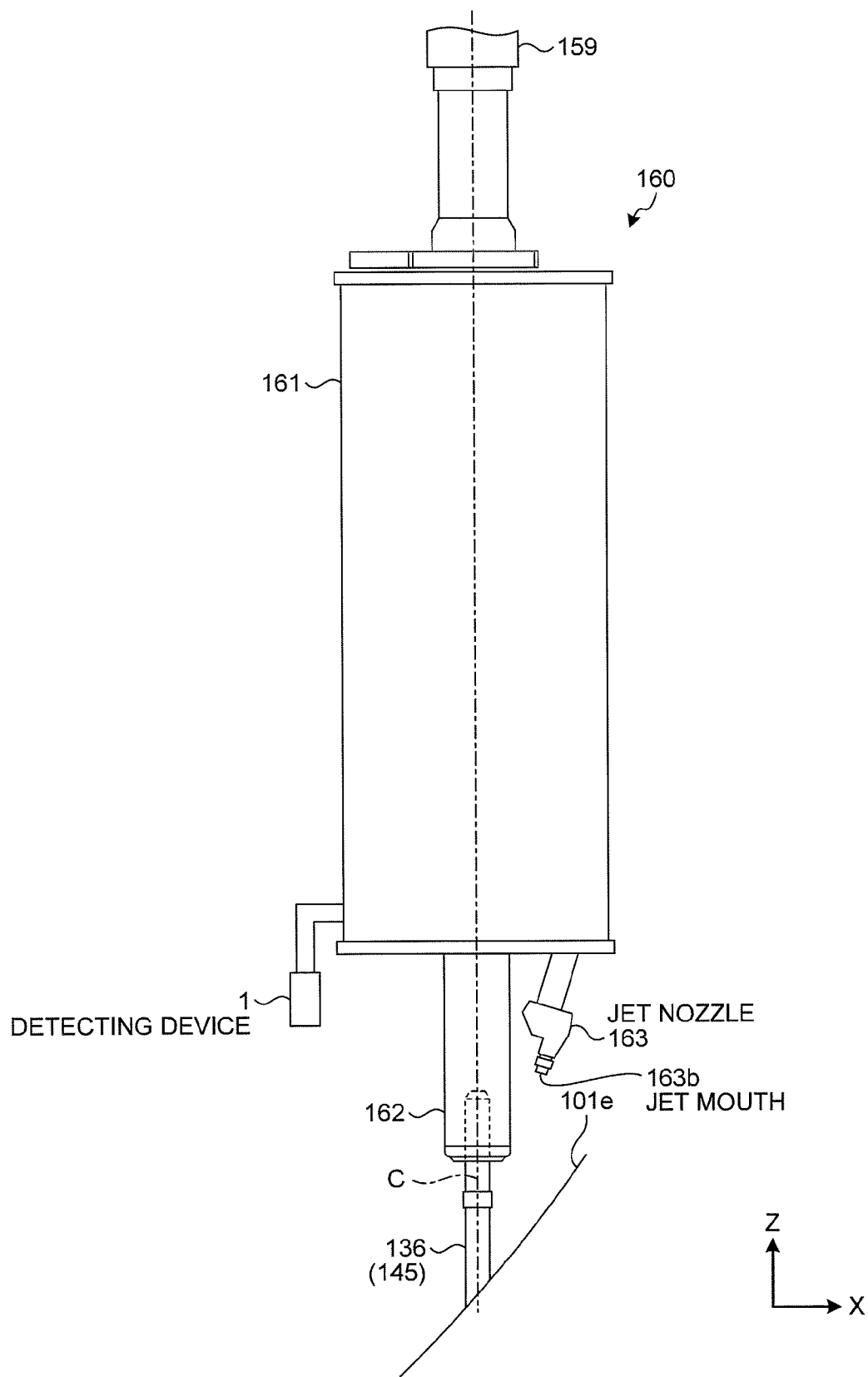
FIG. 5 is a front view illustrating an example of the water jet peening apparatus according to the first embodiment.

Next, an example of a water jet peening apparatus 160 according to this embodiment will be described. FIG. 4 is a diagram illustrating an installation example of the water jet peening apparatus 160 according to this embodiment. FIG. 5 is a diagram illustrating an example of the water jet peening apparatus 160 according to this embodiment. As illustrated in FIG. 4 and FIG. 5, the water jet peening apparatus 160 performs processing for relieving residual stress in a target to be processed (a surface of the in-reactor instrumentation tube 145, a surface of the bottom head 101e, and the like) in a state of being mounted on the instrumentation nozzle 136 (in-reactor instrumentation tube 145).

As illustrated in FIG. 4, the nuclear power plant AP has: a guide rail 155, which is arranged on an operation floor 151 of a nuclear reactor building; a movable crane 156, which is guided by the guide rail 155; and a cavity 152, which is provided below the operation floor 151 and filled with cooling water. The nuclear reactor vessel 101 is arranged inside the cavity 152.

The movable crane 156 has an electric hoist 157 and a hook 158, which is supported by the electric hoist 157, and the movable crane 156 is movable in each of the X-axis direction and Y-axis direction. The electric hoist 157 is able to move the hook 158 in the Z-axis direction. The hook 158 supports the water jet peening apparatus 160 via an installation pole 159. By a moving apparatus including the electric hoist 157 and the movable crane 156, the water jet peening apparatus 160 is able to move in each of the X-axis direction, Y-axis direction, and Z-axis direction.

As illustrated in FIG. 4 and FIG. 5, the water jet peening apparatus 160 includes an apparatus main body 161, a connecting member 162, a jet nozzle 163 having a jet mouth 163b from which water is jetted out, and a detecting device 1 that is able to detect sound.

The connecting member 162 is arranged below the apparatus main body 161 and protrudes downwards from the apparatus main body 161. The connecting member 162 is connected to the instrumentation nozzle 136 (in-reactor instrumentation tube 145). Thereby, the apparatus main body 161 is fixed to the instrumentation nozzle 136.

The jet nozzle 163 is arranged in water and jets out, in the water, water (high pressure water) from the mouth 163b. The jet nozzle 163 is provided in the apparatus main body 161 to be opposite to a surface of a target to be processed. In this embodiment, the surface of the target to be processed includes at least one of: an outer surface of the instrumentation nozzle 136 (in-reactor instrumentation tube 145); an inner surface of the bottom head 101e; and a surface of the groove-welded portion 147. In a state where the mouth 163b of the jet nozzle 163 and the target to be processed, which are arranged in water, are opposite to each other, water is jetted out from the mouth 163b.

As illustrated in FIG. 4, the jet nozzle 163 is connected to a high pressure water pump 164 via a feed pipe 163a. Via the feed pipe 163a, high pressure water is fed to the jet nozzle 163 from the high pressure water pump 164. Thereby, the jet nozzle 163 is able to jet the high pressure water from the mouth 163b in a state of being arranged in water.

The detecting device 1 is arranged in the apparatus main body 161 and detects sound in at least a part of a period during which water is being jetted out from the mouth 163b. The detecting device 1 includes an underwater microphone, and detects sound in a state of being arranged in water.

Figure 6:
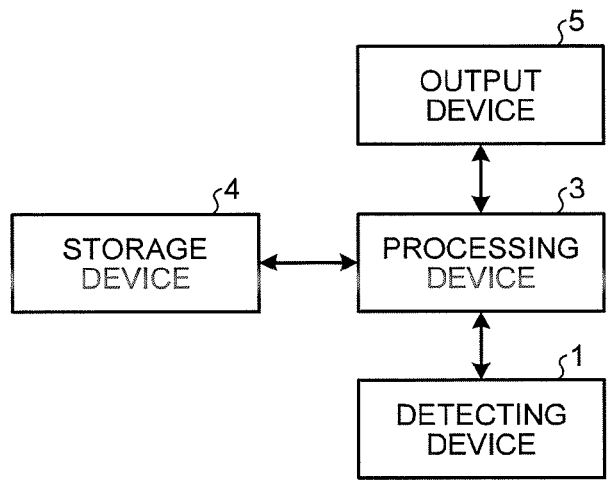
FIG. 6 is a functional block diagram of the water jet peening apparatus according to the first embodiment.

FIG. 6 is a functional block diagram illustrating the water jet peening apparatus 160 according to this embodiment. As illustrated in FIG. 4 and FIG. 6, the detecting device 1 is connected to a processing device 3 via a cable 2. The processing device 3 includes a calculating unit, such as a central processing unit (CPU) that is able to process a detection signal output from the detecting device 1, and a frequency analyzer, such as an FFT analyzer. In this embodiment, a storage device 4 is connected to the processing device 3. The storage device 4 includes at least one of a random access memory (RAM), a read only memory (ROM), a flash memory, and a hard disk drive. Further, an output device 5 is connected to the processing device 3. The output device 5 includes at least one of a display device, such as a flat panel display, and a printing device. The processing device 3 and storage device 4 are arranged on, for example, the operation floor 151. The detection signal of the detecting device 1 is output to the processing device 3 via the cable 2.

As illustrated in FIG. 5, in a state where the connecting member 162 and the instrumentation nozzle 136 are connected to each other, the apparatus main body 161 is rotatable around a central axis C parallel to the Z-axis. The jet nozzle 163 is arranged at a position away from the central axis C. Thus, by the apparatus main body 161 rotating around the central axis C, the jet nozzle 163 moves to revolve around the central axis C. Further, the jet nozzle 163 is movable in the Z-axis direction. Thereby, a relative position between the mouth 163b and a target to be processed is adjusted. The adjustment of the relative position between the mouth 163b and the target to be processed includes at least one of: adjustment of a distance between the mouth 163b and a surface of the target to be processed; and adjustment of a jet direction of water jetted out from the mouth 163*b* (an incident direction of water from the mouth 163*h* with respect to the surface of the target to be processed).

In this embodiment, each of the jet nozzle 163 and the detecting device 1 is connected to the apparatus main body 161. Even if the apparatus main body 161 rotates around the central axis C in a state where the connecting member 162 and instrumentation nozzle 136 are connected to each other, a relative position between the jet nozzle 163 and the detecting device 1 does not change.

In this embodiment, the detecting device 1 is arranged at a position away from the central axis C. Therefore, by the apparatus main body 161 rotating around the central axis C, the detecting device 1 moves to revolve around the central axis C.

In this embodiment, the detecting device 1 is arranged higher than the jet nozzle 163. That is, in this embodiment, the detecting device 1 is, more than the jet nozzle 163, away from the target to be processed. Further, the detecting device 1 is arranged to not come into contact, as far as possible, with the bubbles generated by the jetting of water from the jet nozzle 163.

As illustrated in FIG. 4, in a state where the cavity 153 is filled with water, the water jet peening apparatus 160 is suspended by the movable crane 156 via the installation pole 159. By movement of the movable crane 156, a position of the apparatus main body 161 (jet nozzle 163 and detecting device 1) with respect to the instrumentation nozzle 136 in the X-Y plane is adjusted. Further, a position of the apparatus main body 161 with respect to the instrumentation nozzle 136 in the Z-axis direction is adjusted by the electric hoist 157. The moving apparatus including the movable crane 156 and the electric hoist 157 adjusts the position of the apparatus main body 161 so as to connect the connecting member 162 to the instrumentation nozzle 136.

When the water jet peening apparatus 160 is fixed to the instrumentation nozzle 136 and the jet nozzle 163 and the detecting device 1 are arranged in water, water is jetted out from the mouth 163*b* while the jet nozzle 163 moves around the target. As described above, the jet nozzle 163 is able to move (revolve) around the central axis C and to move (up and down) in the Z-axis direction. By water being jetted out from the mouth 163*b* of the jet nozzle 163 in a state where the mouth 163*b* and the target to be processed, which are arranged in water, are opposite to each other, the shock waves generated by the collapse of the bubbles included in the water hit at least one of the external surface of the instrumentation nozzle 136 (in-reactor instrumentation tube 145), the inner surface of the bottom head 101*e*, and the surface of the groove-welded portion 147. Thereby, the residual stress on the outer surface of the instrumentation nozzle 136 (in-reactor instrumentation tube 145), the inner surface of the bottom head 101*e*, and the surface of the groove-welded portion 147 is relieved.

Figure 7:
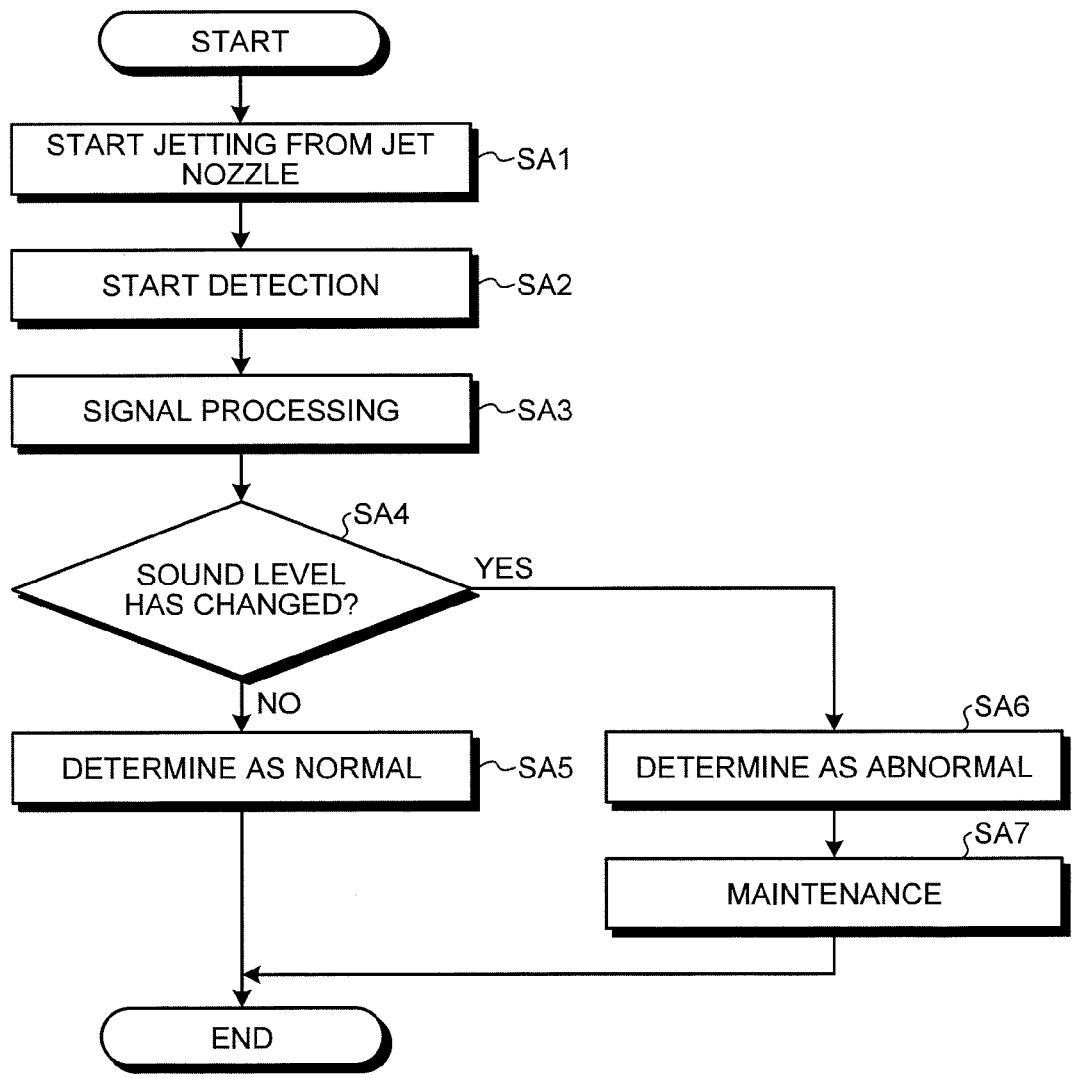
FIG. 7 is a flow chart illustrating an example of a water jet peening method according to the first embodiment.

Next, an example of a water jet peening method according to this embodiment will be described with reference to FIG. 7. FIG. 7 is a flow chart illustrating the example of the water jet peening method according to this embodiment.

In a state where the mouth 163*b* of the jet nozzle 163 and a target to be processed, which are arranged in water, are opposite to each other, jetting of water from the mouth 163*b* is started (Step SA1). Thereby, the target to be processed is water-jet-peened.

In at least a part of a period during which the water is being jetted out from the mouth 163*b*, the detecting device 1 arranged in the water starts detecting sound (Step SA2). In this embodiment, the detecting device 1 continues to detect sound in a period during which water jet peening is being performed. That is, the detecting device 1 continuously monitors sound during the water jet peening processing period.

A detection signal of the detecting device 1 is output to the processing device 3. The processing device 3 processes (signal-processes) the detection signal from the detecting device 1 (Step SA3). In this embodiment, the processing device 3 analyzes frequency characteristics of a detection signal related to sound, the detection signal being output from the detecting device 1. The frequency characteristics include dominant frequencies and distribution and sound pressure level. The processing device 3 analyzes a dominant frequencies and distribution of the detection signal related to the sound, the detection signal being output from the detecting device 1. Further, the processing device 3 analyzes a change in sound pressure level at some predetermined frequencies of sound detected by the detecting device 1. The change in sound pressure level includes at least one of: presence or absence of a change in sound pressure level; an amount of the change in sound pressure level (degree of change, or degree of increase or decrease); a change in the gradient of a tangent when a relation between frequency and sound pressure level is graphed; and a change in distribution of sound pressure level versus frequency.

By water being jetted out from the mouth 163*b* of the jet nozzle 163, sound is generated. The detecting device 1 detects the sound generated from the jet nozzle 163 in a state where water is being jetted out from the mouth 163*b*. Further, the detecting device 1 detects, not only the sound generated by the jet nozzle 163, but also reflected sound thereof. The processing device 3 detects, based on the sound detected by device 1, abnormality occurs or not in the jet nozzle 163. According to the following description, the detecting device 1 detects the sound generated by the jet nozzle 163, but as described above, the detecting device 1 also detects the reflected sound.

The sound (one or both of frequency components and sound pressure level) generated by the jet nozzle 163 when water is jetted out from the mouth 163*b* of the jet nozzle 163 in a normal state is different from the sound generated by the jet nozzle 163 when water is jetted out from the mouth 163*b* of the jet nozzle 163 in an abnormal state. Therefore, the processing device 3 is able to determine, based on the result of detection by the detecting device 1, whether or not abnormality has occurred in the jet nozzle 163.

Abnormality in the jet nozzle 163 includes wearing of the jet nozzle 163. The jet nozzle 163 in a normal state (for example, the jet nozzle 163 that is brand new) is not worn. The jet nozzle 163 may be worn down by usage. Depended on states, environments, and periods, in which the jet nozzle 163 is used, worn states of the jet nozzle 163 may vary.

Figure 8:
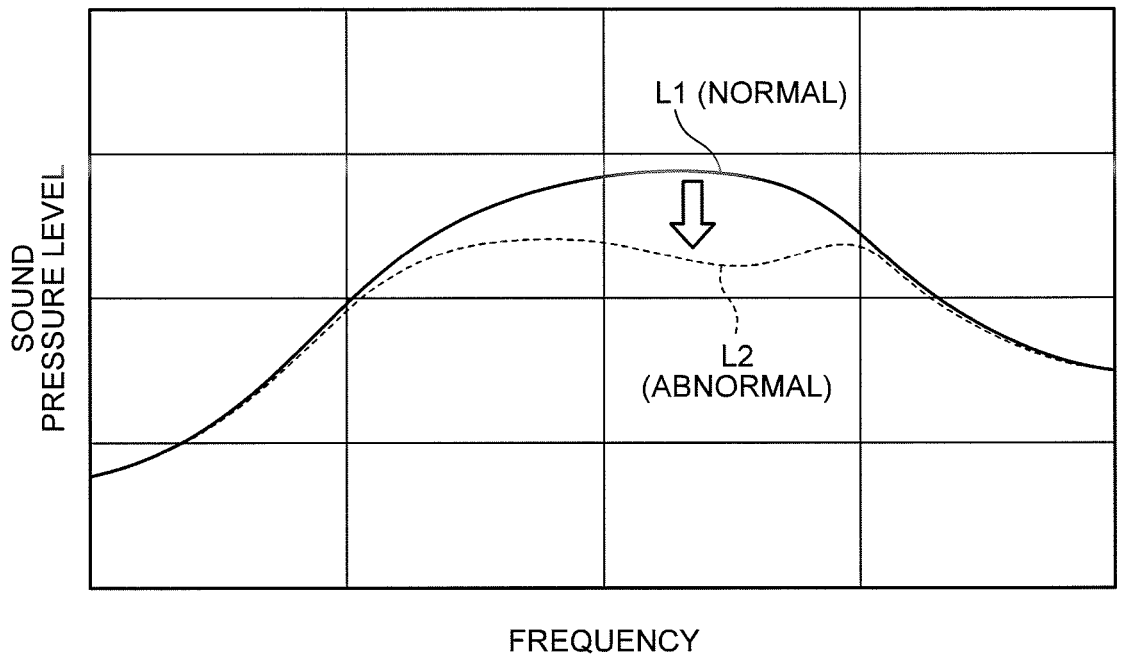
FIG. 8 is a diagram illustrating an example of a relation between frequency and sound pressure level, of sound generated by a jet nozzle according to the first embodiment.

FIG. 8 is a diagram illustrating an example of a relation between frequency and sound pressure level, of each of: sound generated when water is jetted out from the mouth 163*b* of the jet nozzle 163 in a normal state; and sound generated when water is jetted out from the mouth 163*b* of the jet nozzle 163 in an abnormal state. FIG. 8 illustrates an example in which results of detection (results of monitoring) by the detecting device 1 have been signal processed, and the signal-processed results have been output to the output device 5.

As illustrated in FIG. 8, when the jet nozzle 163 changes from the normal state to the abnormal state, the sound pressure level at a predetermined frequency (frequency domain) of sound detected by the detecting device 1 changes as represented by the change from a line L1 to a line L2. In the example illustrated in FIG. 8, when the jet nozzle 163 changes from the normal state (line L1) to the abnormal state (line L2), the sound pressure level at the predetermined frequency is decreased. When the jet nozzle 163 changes from the normal state (line L1) to the abnormal state (line L2), the sound pressure level at a predetermined frequency may be increased. Therefore, the processing device 3 is able to determine, based on the results of detection by the detecting device 1, whether or not abnormality has occurred in the jet nozzle 163. In this embodiment, the processing device 3 detects, based on the change in the sound pressure level at the predetermined frequency of the sound detected by the detecting device 1, abnormality in the jet nozzle 163.

The processing device 3 determines, based on the results of detection (results of monitoring) by the detecting device 1, whether the sound pressure level at the predetermined frequency (frequency domain) has changed (Step SA4).

If an amount of the change in the sound pressure level is less than a predetermined threshold value (or level), the processing device 3 determines that the sound pressure level has not changed and that abnormality has not yet occurred in the jet nozzle 163 (that the jet nozzle 163 is normal) (Step SA5).

On the contrary, if the amount of the change in the sound pressure level is greater than the predetermined threshold value, the processing device 3 determines that the sound pressure level has changed and that abnormality has occurred in the jet nozzle 163 (Step SA6). In this embodiment, the processing device 3 determines, based on the change in the sound pressure level, that the jet nozzle 163 has been worn down.

If abnormality have been occurred in the jet nozzle 163, predetermined maintenance, such as, for example, replacement of the jet nozzle 163, is performed (Step SA7).

As described above, according to this embodiment, since the detecting device 1 is arranged in the water where the jet nozzle 163 is arranged, sound generated by the jet nozzle 163 is able to be accurately detected by the detecting device 1.

For example, if the detecting device 1 is not arranged in the water and is arranged outside the nuclear reactor vessel 101, the sound generated by the jet nozzle 163 may not be accurately detectable. If the detecting device 1 is arranged outside the nuclear reactor vessel 101, the detecting device 1 is more likely to detect unnecessary sound (other sound or noise components), such as, for example, an natural frequencies of the nuclear reactor vessel 101 or resonance of the piping system.

According to this embodiment, since the detecting device 1 and the jet nozzle 163 are arranged in the same space (in this embodiment, the internal space of the nuclear reactor vessel 101) filled with water, detection of unnecessary sound by the detecting device 1 is suppressed. Since the detecting device 1 is able to accurately detect the sound generated by the jet nozzle 163, based on the result of the detection, information related to a state of the jet nozzle 163 is able to be obtained accurately. The sound generated by the jet nozzle 163 in a normal state is different from the sound generated by the jet nozzle 163 in an abnormal state. Thus, by detecting the sound generated by the jet nozzle 163 by the detecting device 1, based on the result of the detection, presence of absence of abnormality in the jet nozzle 163 is able to be determined. Therefore, occurrence of, the problem of water jet peening being continuously performed with the jet nozzle 163 in an abnormal state, is suppressed. Therefore, a target to be processed is able to be processed well by using water jet peening.

Further, if the jet nozzle 163 is abnormal, even if water jet peening is performed with the jet nozzle 163 in that abnormal state, desired bubbles (shock waves) are not obtained. As a result, desired processing is difficult to be performed on a target to be processed. According to this embodiment, based on the result of the detection by the detecting device 1, wellness of the jet nozzle 163 is able to be grasped and thus whether or not water jet peening has been performed well is able to be determined.

Further, according to this embodiment, the processing device 3 determines, based on the change in the sound pressure level at the predetermined frequency of the sound detected by the detecting device 1, whether or not abnormality has occurred in the jet nozzle 163. Thereby, abnormality in the jet nozzle 163 is able to be detected accurately. If the jet nozzle 163 changes from a normal state to an abnormal state when the sound pressure level at the predetermined frequency of the sound generated by the jet nozzle 163 is changed and as a result, the sound pressure level at the predetermined frequency of the sound detected by the detecting device 1 is changed. Therefore, based on the change in the sound pressure level at the predetermined frequency of the sound detected by the detecting device 1, it is able to be detected that the jet nozzle 163 is abnormal, or not.

Further, according to this embodiment, as abnormality in the jet nozzle 163, whether or not the jet nozzle 163 has been worn down, is determined. As a result, a state of the wearing, which is one form of abnormality likely to occur in the jet nozzle 163, is able to be accurately grasped.

In this embodiment, abnormality in the jet nozzle 163 may be detected, not only by the change in the sound pressure level, but also by a change in frequency of a peak level (dominant frequency). Similarities apply to the following embodiments.

As described above, the detecting device 1 detects, not only the sound generated by the jet nozzle 163, but also the reflected sound thereof. The processing device 3 may determine, based on the sound and the reflected sound detected by the detecting device 1, presence or absence of abnormality in the jet nozzle 163. Similar things apply to the following embodiments.

Second Embodiment

A second embodiment will be described. In the following description, the same signs will be appended, and description thereof will be simplified or omitted, to components that are identical or equivalent to those of the above described embodiment.

In the above described first embodiment, an example has been described, in which, in a period during which water jet peening is performed, the detecting device 1 continuously monitors sound, and based on the change in the sound generated by the jet nozzle 163, whether or not abnormality has occurred in the jet nozzle 163 is determined. In this embodiment, an example will be described, in which information related to sound of the jet nozzle 163 in a normal state is obtained beforehand, and based on that information related to the sound of the jet nozzle 163 in the normal state. It is determined whether or not abnormality has occurred in the jet nozzle 163 to be evaluated is determined.

Figure 9:
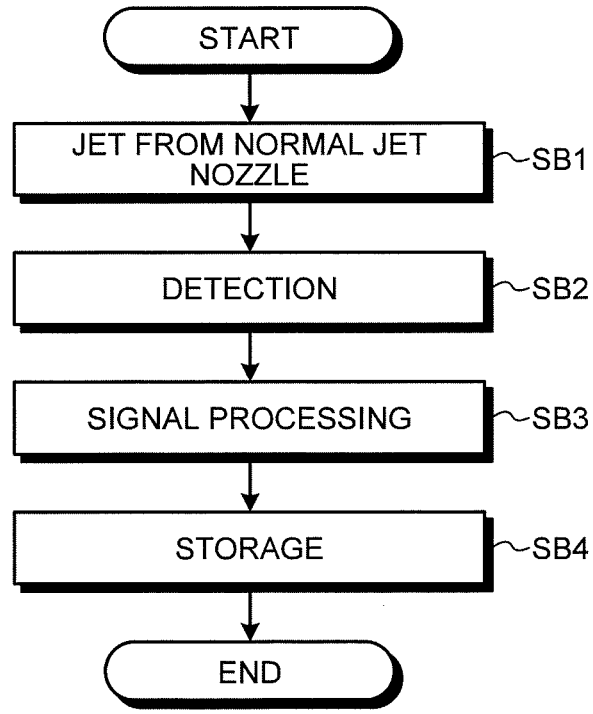
FIG. 9 is a flow chart illustrating an example of a method of evaluating a nozzle according to a second embodiment.
Figure 10:
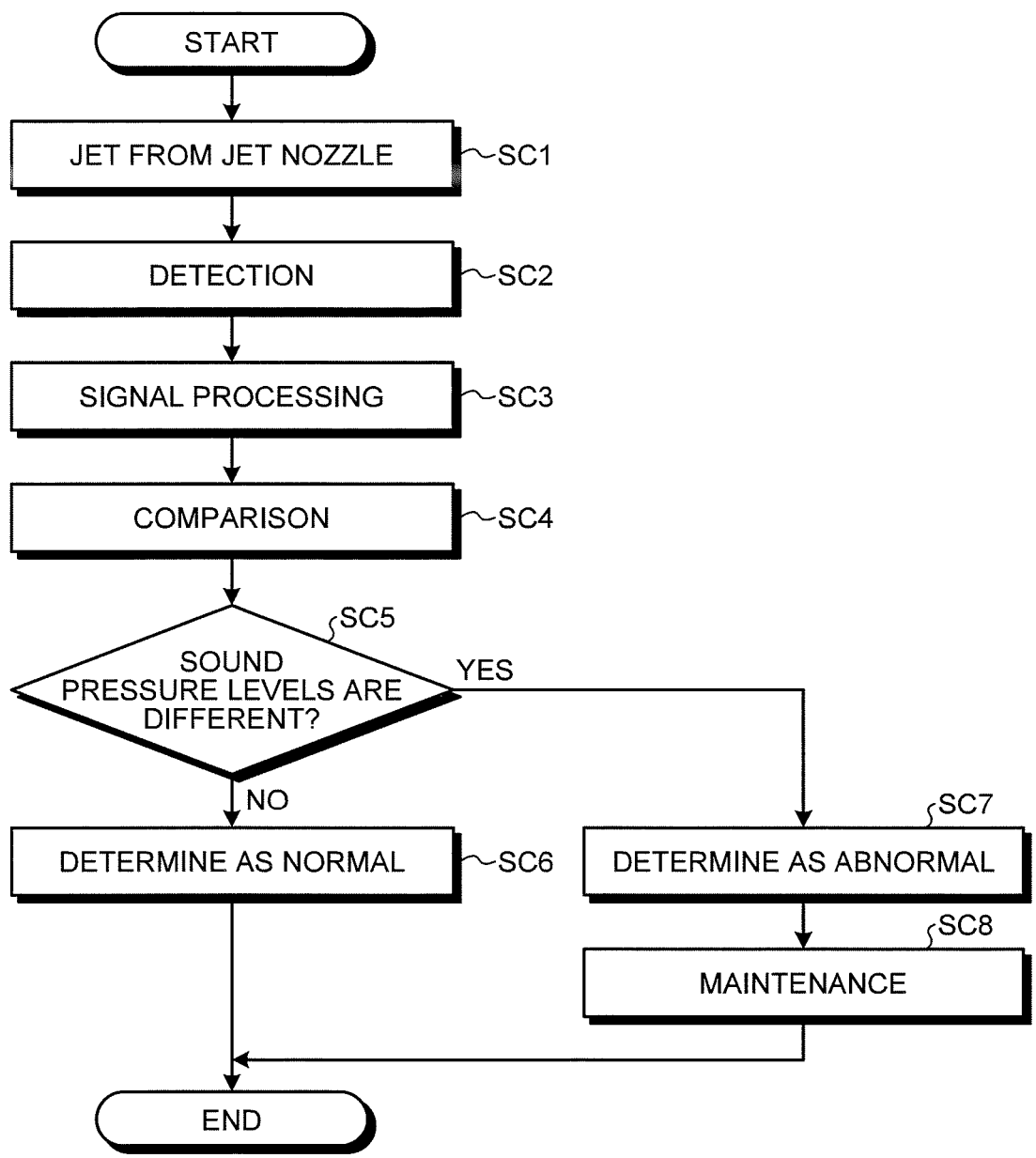
FIG. 10 is a flow chart illustrating the example of the method of evaluating a nozzle according to the second embodiment.

FIG. 9 and FIG. 10 are flow charts illustrating an example of a method of evaluating the jet nozzle 163 according to this embodiment. FIG. 9 illustrates a sequence of obtaining information related to sound of the jet nozzle 163 in a normal state (for example, the jet nozzle 163 that is brand new). FIG. 10 illustrates a sequence of an example of a method of evaluating the jet nozzle 163 to be evaluated.

With reference to FIG. 9, the sequence of obtaining the information related to the sound of the jet nozzle 163 in the normal state will be described. In the following description, the jet nozzle 163 in the normal state will be referred to as "reference jet nozzle 163" as appropriate, and the information related to the sound of the jet nozzle 163 in the normal state will be referred to as "reference data" as appropriate.

The reference jet nozzle 163 and the detecting device 1 are arranged in the same space filled with water. In this embodiment, the reference jet nozzle 163 and the detecting device 1 are arranged in the internal space of the nuclear reactor vessel 101 filled with water.

Water is jetted out from the mouth 163b of the reference jet nozzle 163 arranged in water (Step SB1). In at least a part of a period during which water is being jetted out from the mouth 163b of the reference jet nozzle 163, the detecting device 1 arranged in the water detects sound (Step SB2).

A detection signal of the detecting device 1 is output to the processing device 3. The processing device 3 processes the detection signal from the detecting device 1 (Step SB3). The processing device 3 analyzes a frequency distribution of the detection signal related to the sound, the detection signal having been output from the detecting device 1. Further, the processing device 3 analyzes a change in sound pressure level at a predetermined frequency of the sound detected by the detecting device 1.

A frequency characteristic of sound generated by the reference jet nozzle 163 when water is jetted out from the mouth 163b of the reference jet nozzle 163 is like the frequency characteristic represented by the line L1 of FIG. 8. The processing device 3 stores, into the storage device 4, information (reference data) related to the sound generated by the reference jet nozzle 163 (Step SB4).

Next, with reference to FIG. 10, it is explained that a sequence of evaluating, based on the reference data, a state of the jet nozzle 163 to be evaluated. In the following description, the jet nozzle 163 to be evaluated will be referred to as "evaluation target jet nozzle 163", and information related to sound of the jet nozzle 163 to be evaluated will be referred to as "evaluation target data" as appropriate.

The evaluation target jet nozzle 163 and the detecting device 1 are arranged in the same space filled with water. In this embodiment, the evaluation target jet nozzle 163 and the detecting device 1 are arranged in the internal space of the nuclear reactor vessel 101 filled with water.

Water is jetted out from the mouth 163b of the evaluation target jet nozzle 163 arranged in the water (Step SC1). In at least a part of a period during which water is being jetted out from the mouth 163b of the evaluation target jet nozzle 163, sound is detected by the detecting device 1 arranged in the water (Step SC2).

A detection signal of the detecting device 1 is output to the processing device 3. The processing device 3 processes (signal-processes) the detection signal from the detecting device 1 (Step SC3). The processing device 3 analyzes a frequency distribution of the detection signal related to the sound. Further, the processing device 3 analyzes a change in sound pressure level at a predetermined frequency of the sound detected by the detecting device 1.

The processing device 3 compares the reference data stored in the storage device 4 with the information (evaluation target data) related to the sound generated by the evaluation target jet nozzle 163 (Step SC4).

The processing device 3 determines whether or not the reference data and the evaluation target data differ from each other at a predetermined frequency (frequency domain) whether or not the sound pressure levels at the predetermined frequency are different from each other (Step SC5).

If a difference between the sound pressure level of the reference data and the sound pressure level of the evaluation target data is less than a predetermined threshold value, the processing device 3 determines that the sound pressure levels are equal, and that abnormality has not occurred in the evaluation target jet nozzle 163 (that the evaluation target jet nozzle 163 is normal) (Step SC6).

On the contrary, if the difference between the sound pressure level of the reference data and the sound pressure level of the evaluation target data is greater than the predetermined threshold value, the processing device 3 determines that the sound pressure levels are different from each other, and that abnormality has occurred in the evaluation target jet nozzle 163 (Step SC7). In this embodiment, the processing device 3 determines, based on the difference between the sound pressure levels that the evaluation target jet nozzle 163 has been worn down.

If abnormality is determined to have occurred in the evaluation target jet nozzle 163, predetermined maintenance, such as, for example, replacement of the evaluation target jet nozzle 163, is performed (Step SC8).

Figure 11:
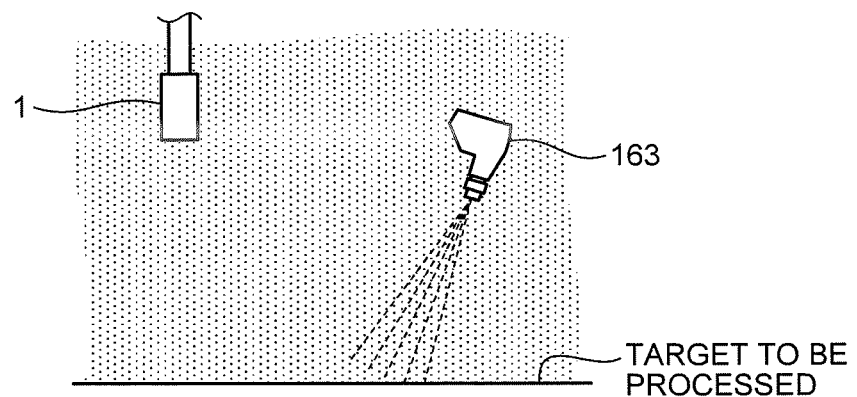
FIG. 11 is a schematic diagram illustrating an example of the method of evaluating a nozzle according to the second embodiment.

The evaluation method according to this embodiment may be performed, as illustrated in a schematic diagram of FIG. 11, along with a water jet peening sequence. That is, the reference jet nozzle 163 and the detecting device 1 are arranged in the same space (internal space of the nuclear reactor vessel 101) filled with water, and while hitting a target to be processed with water jetted out from the mouth 163b of the reference jet nozzle 163, the sequence described with reference to FIG. 9 is executed to obtain the reference data. Thereafter, the evaluation target jet nozzle 163 and the detecting device 1 are arranged in the same space (internal space of the nuclear reactor vessel 101) filled with water, and while hitting the target to be processed with water jetted out from the mouth 163b of the evaluation target jet nozzle 163, the sequence described with reference to FIG. 10 may be executed to obtain the evaluation target data.

Figure 12:
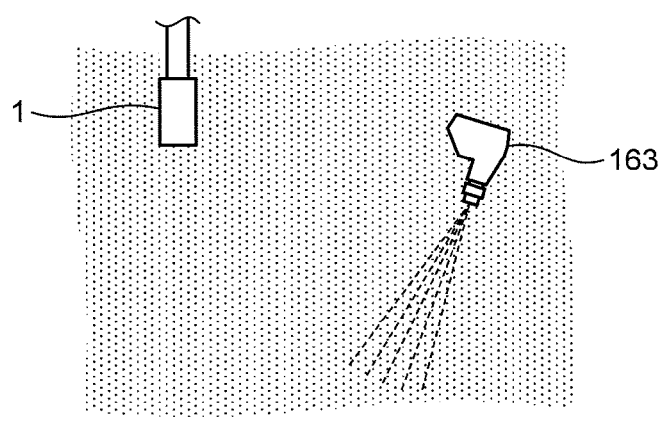
FIG. 12 is a schematic diagram illustrating an example of the method of evaluating a nozzle according to the second embodiment.

The evaluation method according to this embodiment may be performed in an evaluation sequence, separately from the water jet peening sequence, as illustrated in a schematic diagram of FIG. 12. That is, the reference jet nozzle 163 and the detecting device 1 are arranged in the same space (internal space of the nuclear reactor vessel 101) filled with water, water is jetted out from the mouth 163b of the reference jet nozzle 163 so that the water does not hit the target to be processed, and the sequence described with reference to FIG. 9 is executed to obtain the reference data. Thereafter, the evaluation target jet nozzle 163 and the detecting device 1 are arranged in the same space (internal space of the nuclear reactor vessel 101) filled with water, water is jetted out from the mouth 163b of the evaluation target jet nozzle 163 so that the water does not hit the target to be processed, and the sequence described with reference to FIG. 10 may be executed to obtain the evaluation target data.

In addition, after executing the sequence described with reference to FIG. 9 to obtain the reference data without hitting the target to be processed with the water jetted out from the mouth 163b of the reference jet nozzle 163, while hitting the target to be processed with water jetted out from the mouth 163b of the evaluation target jet nozzle 163, the sequence described with reference to FIG. 10 may be executed to obtain the evaluation target data.

As described above, according to this embodiment, since the reference data are obtained beforehand and the reference data are compared with the evaluation target data of the evaluation target jet nozzle 163, presence or absence of abnormality in the evaluation target jet nozzle 163 is able to be determined accurately.

Third Embodiment

A third embodiment will be described. In the following description, to components that are identical or equivalent to those of the above described embodiments, the same signs will be appended, and description thereof will be simplified or omitted.

In the first embodiment and second embodiment, an example has been described, in which whether or not abnormality has occurred in the jet nozzle 163 is determined, based on the sound pressure level at a predetermined frequency. In this embodiment, an example will be described, in which a type of abnormality is determined based on a frequency of sound that has changed in its sound pressure level.

Figure 13:
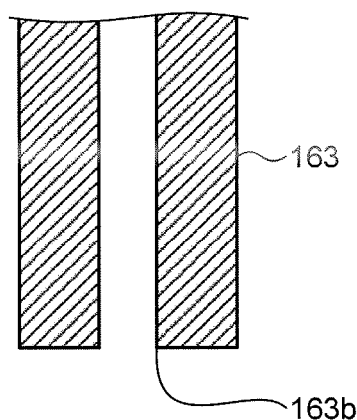
FIG. 13 is a schematic diagram illustrating an example of a normal nozzle according to a third embodiment.
Figure 14:
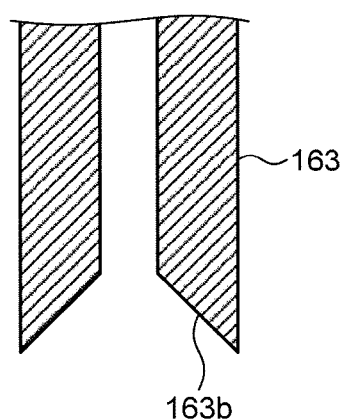
FIG. 14 is a schematic diagram illustrating an example of an abnormal nozzle according to the third embodiment.
Figure 15:
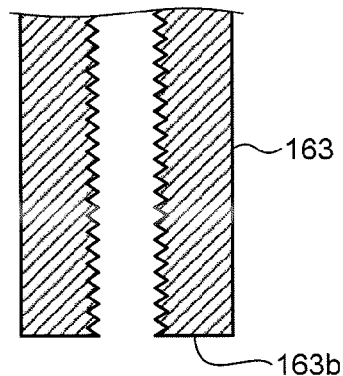
FIG. 15 is a schematic diagram illustrating an example of the abnormal nozzle according to the third embodiment.

FIG. 13 is a schematic diagram illustrating an example of the jet nozzle 163 in a normal state. FIG. 14 and FIG. 15 are schematic diagrams illustrating examples of the jet nozzle 163 in an abnormal state. Abnormality in the jet nozzle 163 includes wearing of the jet nozzle 163. Based on states, environments, and periods, in which the jet nozzle 163 is used, worn states of the jet nozzle 163 may vary. Each of FIG. 14 and FIG. 15 is an example of a worn state of the jet nozzle 163. By the jet nozzle 163 in a normal state being worn down, as illustrated in FIG. 14, for example, an inner surface of a flow channel of the jet nozzle 163 connected to the mouth 163b may be worn down to become sloped (tapered). Further, as illustrated in FIG. 15, the jet nozzle 163 may be worn down such that grooves (for example, spiral grooves) are formed on the inner surface of the flow channel of the jet nozzle 163 connected to the mouth 163b.

With reference to FIG. 14 and FIG. 15, the two worn states have been described. More than one worn state exists based on states, environments, and periods, in which the jet nozzle 163 is used. For example, with respect to the worn state where the inner surface of the flow channel of the jet nozzle 163 is sloped (tapered), plural worn states with different angles of the tapered surface may occur. Further, with respect to the worn state where the grooves are formed on the inner surface of the flow channel of the jet nozzle 163, plural worn states with the numbers of grooves, depths of the grooves, and shapes of the grooves being different from one another, may occur. Further, a worn state may occur, where the inner surface of the flow channel of the jet nozzle 163 is tapered and at the same time, grooves are formed on the inner surface of the flow channel of the jet nozzle 163. Accordingly, plural types (forms or patterns) of abnormality (wearing) that occurs in the jet nozzle 163 exist, based on the states, environments, and periods, in which the jet nozzle 163 is used.

Figure 16:
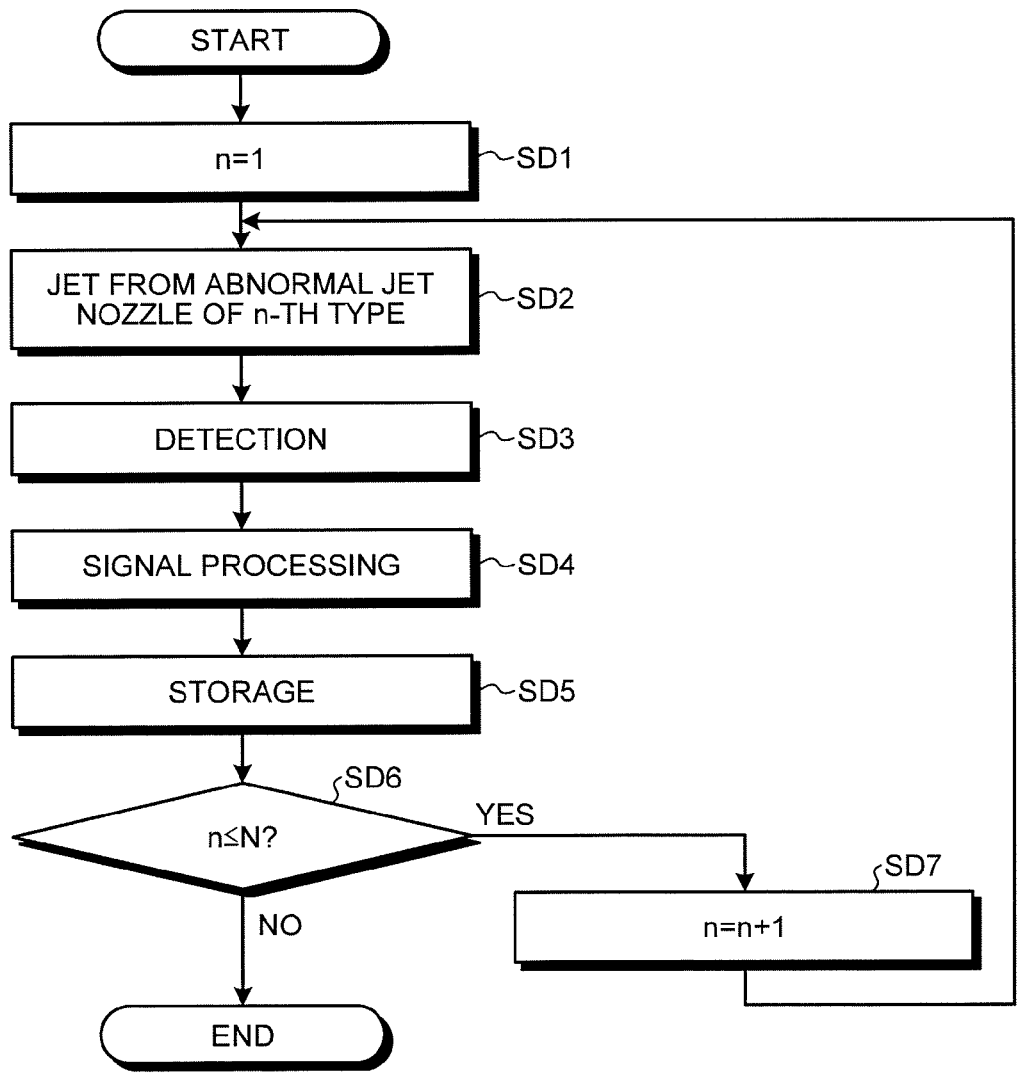
FIG. 16 is a flow chart illustrating an example of a method of evaluating a nozzle according to the third embodiment.
Figure 17:
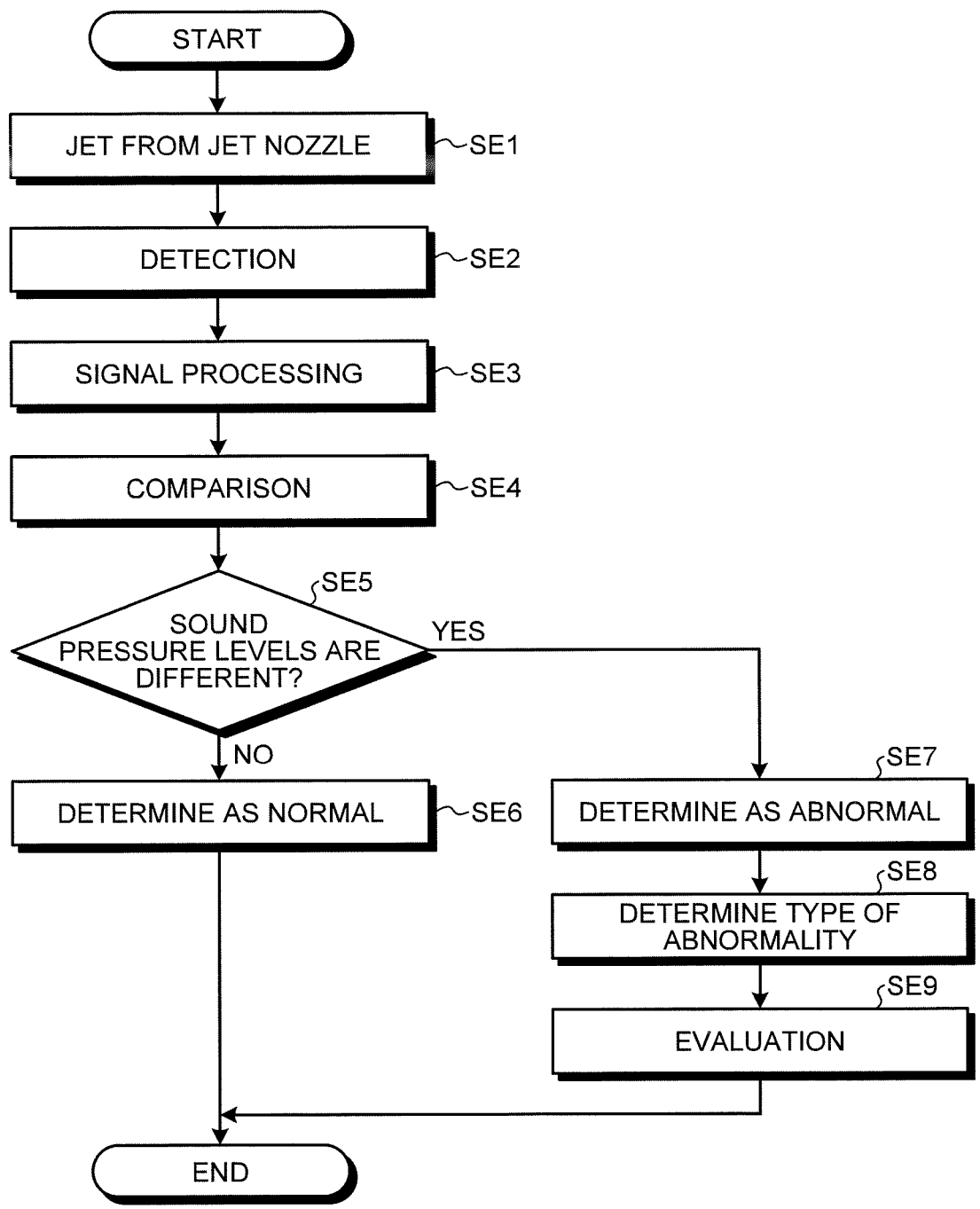
FIG. 17 is a flow chart illustrating the example of the method of evaluating a nozzle according to the third embodiment.

FIG. 16 and FIG. 17 are flow charts illustrating an example of a method of evaluating the jet nozzle 163 according to this embodiment. FIG. 16 illustrates a sequence of obtaining information related to sound of the jet nozzles 163 corresponding each of a plurality of types of abnormality. FIG. 17 illustrates a sequence of evaluating a state of the evaluation target jet nozzle 163.

With reference to FIG. 16, a sequence of obtaining the information related to the sound of the jet nozzle 163 corresponding to each of the plurality of types of abnormality will be described. In the following description, the jet nozzle 163 in abnormal states of the plurality of types will be referred to as "abnormal pattern jet nozzle 163" as appropriate and information related to sound of the jet nozzle 163 in the abnormal states will be referred to as "abnormal pattern data" as appropriate. In this embodiment, an example of obtaining abnormality pattern data of "N" types (as many as "N") will be described.

In this embodiment, abnormal pattern jet nozzles 163 of a first type to an N-th type are prepared beforehand. Information related to sound of each of the "N" types of the abnormal pattern jet nozzles 163 (abnormal pattern data) is obtained. Of the "N" types of the abnormal pattern jet nozzles 163, one abnormal pattern jet nozzle 163 may be the jet nozzle 163 described with reference to FIG. 14, for example. Of the "N" types of the abnormal pattern jet nozzles 163, one abnormal pattern jet nozzle 163 may be the jet nozzle 163 described with reference to FIG. 15, for example.

As illustrated in FIG. 16, after a counter "n" is set to be equal to 1 (Step SD1), the abnormal pattern jet nozzle 163 of the first type (first pattern) and the detecting device 1 are arranged in the same space (internal space of the nuclear reactor vessel 101) filled with water.

Water is jetted out from the mouth 163b of that abnormal pattern jet nozzle 163 of the first type (Step SD2). In at least a part of a period during which water is being jetted out from the mouth 163b of the abnormal pattern jet nozzle 163 of the first type, the detecting device 1 arranged in the water detects sound (Step SD3).

A detecting signal of the detecting device 1 is output to the processing device 3. The processing device 3 processes the detection signal from the detecting device 1 (Step SD4). The processing device 3 analyzes a frequency distribution of the detection signal related to the sound, the detection signal having been output from the detecting device 1. Further, the processing device 3 analyzes a change in sound pressure level at a predetermined frequency of the sound detected by the detecting device 1.

Sound is generated when the abnormal pattern jet nozzle 163 of the first type when water is jetted out from the jet mouth 163b of that abnormal pattern jet nozzle 163. Information related to the sound (first abnormal pattern data) is stored in the storage device 4 (Step SD5).

Next, whether or not the counter "n" is equal to or less than "N" is determined (Step SD6) and if the counter "n" is determined to be equal to or less than "N", processing to make the counter "n" equal to "n+1" is performed (Step SD7) and the above described sequence (Step SD2 to Step SD5) is performed for the abnormal pattern jet nozzle 163 of the second type.

The processing device 3 performs the above described sequence (Step SD2 to Step SD5) for each of the abnormal pattern jet nozzles 163 of the "N" types ("N" patterns). As a result, abnormal pattern data are related to each of the abnormal pattern jet nozzles 163 of the first type to the N-th type (first abnormal pattern data to N-th abnormal pattern data). Those abnormal pattern data are obtained and stored in the storage device 4.

Further, in this embodiment, information (reference data) related to sound of the jet nozzle 163 in a normal state (reference jet nozzle) is also stored in the storage device 4.

Next, with reference to FIG. 17, a sequence of evaluating a state of the evaluation target jet nozzle 163 will be described.

The evaluation target jet nozzle 163 and the detecting device 1 are arranged in the same space (internal space of the nuclear reactor vessel 101) filled with water.

Water is jetted out from the mouth 163*b* of the evaluation target jet nozzle 163 arranged in the water (Step SE1). In at least a part of a period during which water is being jetted out from the mouth 163*b* of the evaluation target jet nozzle 163, sound is detected by the detecting device 1 arranged in the water (Step SE2).

A detection signal of the detecting device 1 is output to the processing device 3. The processing device 3 processes (signal-processes) the detection signal from the detecting device 1 (Step SE3). The processing device 3 analyzes a frequency distribution of the detection signal related to the sound, the detection signal having been output from the detecting device 1. Further, the processing device 3 analyzes a change in sound pressure level at a predetermined frequency of the sound detected by the detecting device 1.

The processing device 3 compares the reference data stored in the storage device 4 with the evaluation target data of the evaluation target jet nozzle 163 (Step SE4). The processing device 3 determines the reference data and the evaluation target data differ from each other at a predetermined frequency (frequency domain) or the sound pressure levels at the predetermined frequency are different from each other (Step SE5).

If a difference between the sound pressure level of the reference data and the sound pressure level of the evaluation target data is less than a predetermined threshold value, the processing device 3 determines that the sound pressure levels are equal, and that abnormality has not occurred in the evaluation target jet nozzle 163 (that the evaluation target jet nozzle 163 is normal) (Step SE6).

On the contrary, if the difference between the sound pressure level of the reference data and the sound pressure level of the evaluation target data is greater than the predetermined threshold value, the processing device 3 determines that the sound pressure levels are different and that abnormality has occurred in the evaluation target jet nozzle 163 (Step SE7). The processing device 3 determines that the evaluation target jet nozzle 163 has been worn down, based on the difference between the sound pressure levels.

In this embodiment, after determining that abnormality has occurred in the evaluation target jet nozzle 163, the processing device 3 determines, based on a frequency (frequency domain) of sound that has changed in the sound pressure level (that has a sound pressure level different) from the reference data, a type of the abnormality occurring in the evaluation target jet nozzle 163 (Step SE8). In this embodiment, the processing device 3 compares each of the plurality of abnormal pattern data (first abnormal pattern data to N-th abnormal pattern data) stored in the storage device 4 with the evaluation target data of the evaluation target jet nozzle 163 to determine the type of the abnormality.

Figure 18:
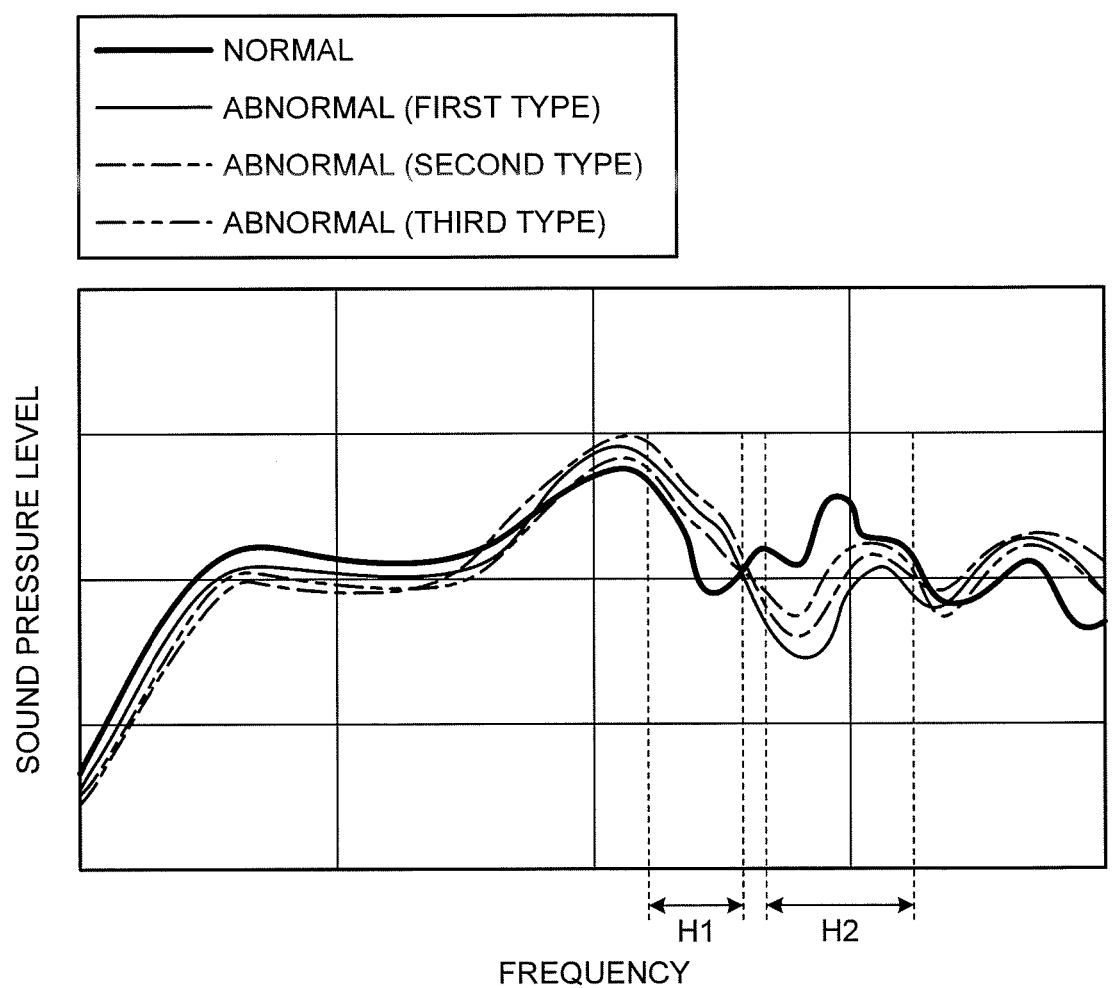
FIG. 18 is a diagram illustrating an example of a relation between frequency and sound pressure level, of sound generated by a jet nozzle according to the third embodiment.

FIG. 18 is a diagram illustrating an example of a relation between frequency and sound pressure level, for each of: sound generated when water is jetted out from the mouth 163*b* of the reference jet nozzle 163; and sound generated when water is jetted out from the mouths 163*b* of the abnormal pattern jet nozzles 163. In FIG. 18, as an example, abnormal pattern data of three types (first type, second type, and third type) of the abnormal pattern jet nozzles 163 are illustrated.

As illustrated in FIG. 18, when abnormality of the first type occurs in the jet nozzle 163, the sound pressure level of the reference data and the sound pressure level of the first abnormal pattern data are different from each other at each of a frequency domain H1 and a frequency domain H2. Similarly, the sound pressure level of the reference data and the sound pressure level of the second abnormal pattern data are different from each other at each of the frequency domain H1 and the frequency domain H2. The sound pressure level of the reference data and the sound pressure level of the third abnormal pattern data are different from each other at each of the frequency domain H1 and the frequency domain H2.

As illustrated in FIG. 18, depending on the types of abnormality generated and the frequency domains, the sound pressure level increases and decreases from the reference data. Further, along with that, changes in the degree of the increase and decrease in the sound pressure level and in the gradient of the tangent are recognized.

Therefore, the processing device 3 is able to determine, based on results of the detection by the detecting device 1, whether or not which type of abnormality has occurred in the evaluation target jet nozzle 163. In this embodiment, the abnormal pattern data of the first type to the N-th type are stored in the storage device 4. The processing device 3 compares the evaluation target data of the evaluation target jet nozzle 163 with each of the plurality of abnormal pattern data stored in the storage device 4, and extracts, from the plurality of abnormal pattern data stored in the storage device 4, the abnormal pattern data that are closest to the evaluation target data of the evaluation target jet nozzle 163. The processing device 3 may extract, from the plurality of abnormal pattern data stored in the storage device 4, the abnormal pattern data that are closest to the evaluation target data, by using a comparison method, such as, for example, a template matching method. Thereby, the processing device 3 is able to determine the type of abnormality occurring in the evaluation target jet nozzle 163.

After the type of the abnormality occurring in the evaluation target jet nozzle 163 is determined, evaluation is performed (Step SE9). For example, predetermined maintenance, such as replacement of the jet nozzle 163, may be performed, such that abnormality of the first type does not occur.

The evaluation method according to this embodiment also may be performed along with the water jet peening sequence as illustrated in the schematic diagram of FIG. 11, or may be performed in an evaluation sequence separately from the water jet peening sequence as illustrated in the schematic diagram of FIG. 12.

As described above, according to this embodiment, a type of abnormality that has occurred in the evaluation target jet nozzle 163 is able to be grasped. Therefore, based on the type of abnormality that has occurred, appropriate measures including maintenance of the jet nozzle 163 are able to be taken, so that abnormality of that type does not occur.

As described above, in the first embodiment to third embodiment, the target to be processed by water jet peening includes at least a part of the nuclear reactor vessel 101. The jet nozzle 163 and the detecting device 1 are arranged in water inside the nuclear reactor vessel 101. The jet nozzle 163 may jet out water from the mouth 163*b* at the deepest portion of the nuclear reactor vessel 101. That is, the jet nozzle 163 may jet out water to an inner surface (bottom surface) that is the lowest in the nuclear reactor vessel 101 (bottom head 101*e*). The detecting device 1 is arranged to be able to detect sound from an arbitrary water depth of the nuclear reactor vessel 101. A distance between the detecting device 1 and the jet nozzle 163 may be adjusted, or a position of the detecting device 1 relative to a water depth direction may be adjusted, so that sound from an arbitrary water depth including at least one of the deepest portion (the deepest water depth portion) and the minimum water depth portion (the shallowest water depth portion) is able to be detected. Thereby, the detecting device 1 is able to detect an acoustic signal caused by water jet peening, the acoustic signal having been generated at an arbitrary water depth including the deepest portion. Not being limited to the sound from the deepest portion, by adjusting the distance between the detecting device 1 and the jet nozzle 163, at any depth in the water inside the nuclear reactor vessel 101, the detecting device 1 is able to detect the sound from the jet nozzle 163 or the sound caused by water jet peening. Similar things apply to the following embodiments.

Fourth Embodiment

A fourth embodiment will be described. In the following description, to components that are identical or equivalent to those of the above described embodiments, the same signs will be appended, and description thereof will be simplified or omitted.

Figure 19:
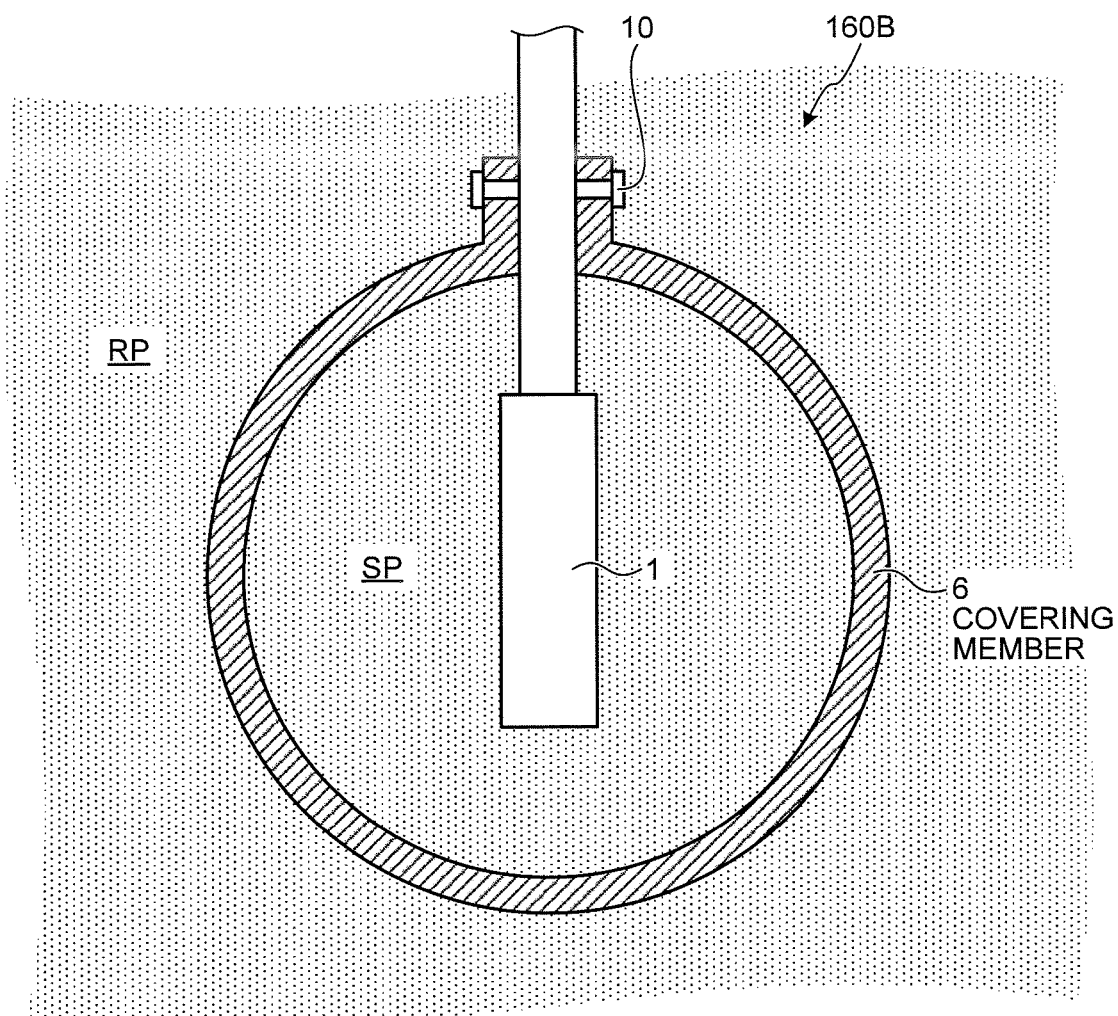
FIG. 19 is a cross section diagram illustrating an example of a water jet peening apparatus according to a fourth embodiment.

FIG. 19 is a cross section diagram illustrating an example of a water jet peening apparatus 160B according to this embodiment. As illustrated in FIG. 19, the water jet peening apparatus 160B includes a covering member 6, which is provided to surround the detecting device 1.

The covering member 6 is made of an acrylic resin. The covering member 6 functions as a protecting member that protects the detecting device 1.

The covering member 6 is a spherical member having an internal space SP. The covering member 6 is fixed to the detecting device 1 by a fixing member 10, such as a bolt member. Water is filled in the internal space SP between the covering member 6 and the detecting device 1.

As described above, according to this embodiment, since the covering member 6 is arranged around the detecting device 1, the detecting device 1 is able to detect the sound generated by the jet nozzle 163 smoothly.

For example, if the sound pressure level of the sound generated by the jet nozzle 163 is high, that sound is likely to be outside a detectable range of the detecting device 1 (overrange). As a result, the detecting device 1 may not be able to detect the sound smoothly. This sound is presumed to be caused by a change in the transfer function accompanying burst of bubbles around the detecting device or attachment of bubbles to the detecting device. Since the covering member 6 is arranged, the extent of bubbles generated by the jet nozzle 163 reaching the detecting device 1 is able to be reduced. Further, in this embodiment, the covering member 6 is made of an acrylic resin. Acrylic resins have acoustic impedance appropriate for detection by the detecting device 1 in water. Therefore, the detecting device 1 is able to detect sound smoothly.

Fifth Embodiment

A fifth embodiment will be described. In the following description, to components that are identical or equivalent to those of the above described embodiments, the same signs will be appended, and description thereof will be simplified or omitted.

Figure 20:
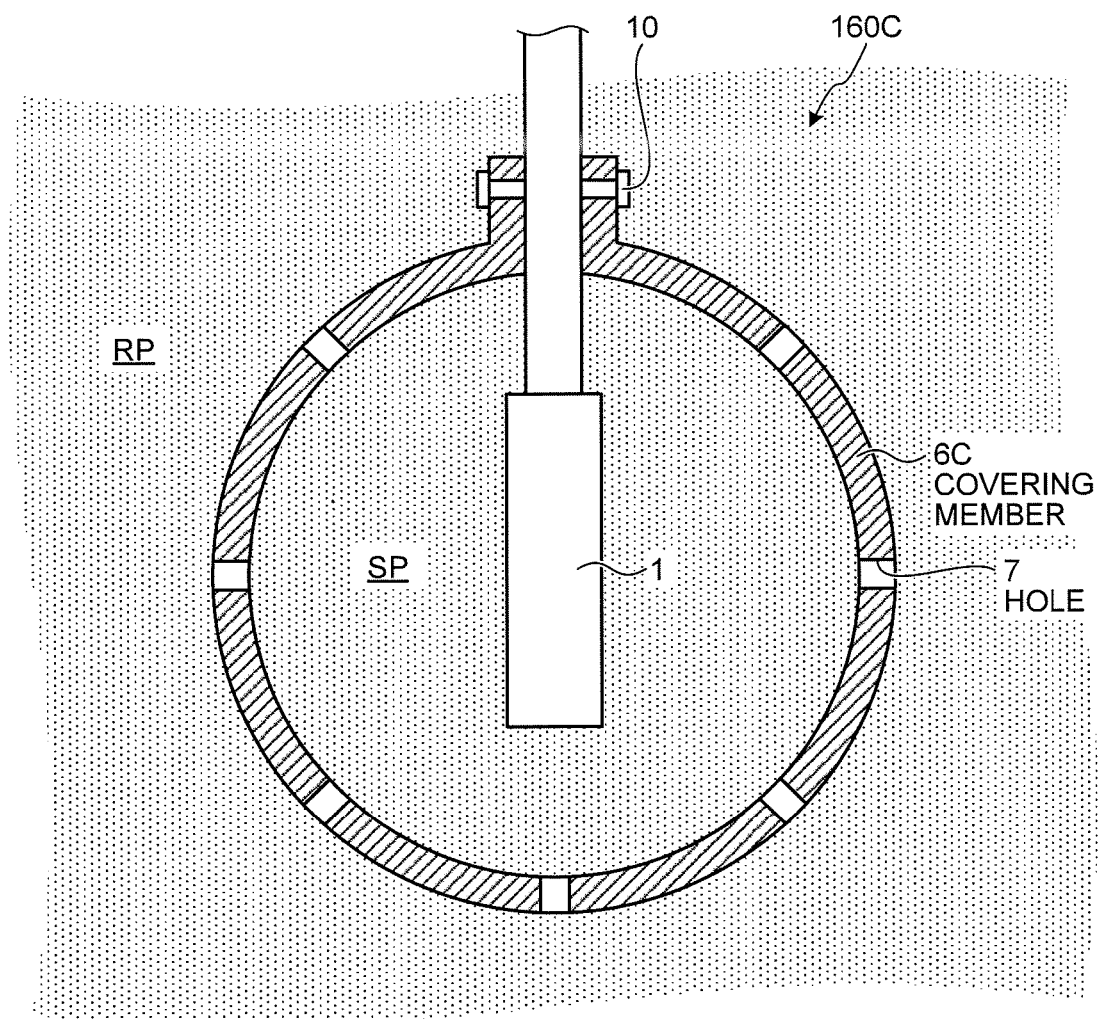
FIG. 20 is a cross section diagram illustrating an example of a water jet peening apparatus according to a fifth embodiment.

FIG. 20 is a cross section diagram illustrating an example of a water jet peening apparatus 160C according to this embodiment. As illustrated in FIG. 20, the water jet peening apparatus 160C includes a covering member 6C, which is provided to surround the detecting device 1 and made of an acrylic resin.

In this embodiment, the covering member 6C has holes 7, which are formed to join the internal space SP of the covering member 6C and an external space RP of the covering member 6C.

As described above, according to this embodiment, since the holes 7 are provided, by immersing the detecting device 1 and the covering member 6C in water in a state where the detecting device 1 and the covering member 6C are fixed together by the fixing member 10, water in the external space RP is able to be caused to flow into the internal space SP via the holes 7. Therefore, the internal space SP is able to be filled with water smoothly.

Sixth Embodiment

A sixth embodiment will be described. In the following description, to components that are identical or equivalent to those of the above described embodiments, the same signs will be appended, and description thereof will be simplified or omitted.

Figure 21:
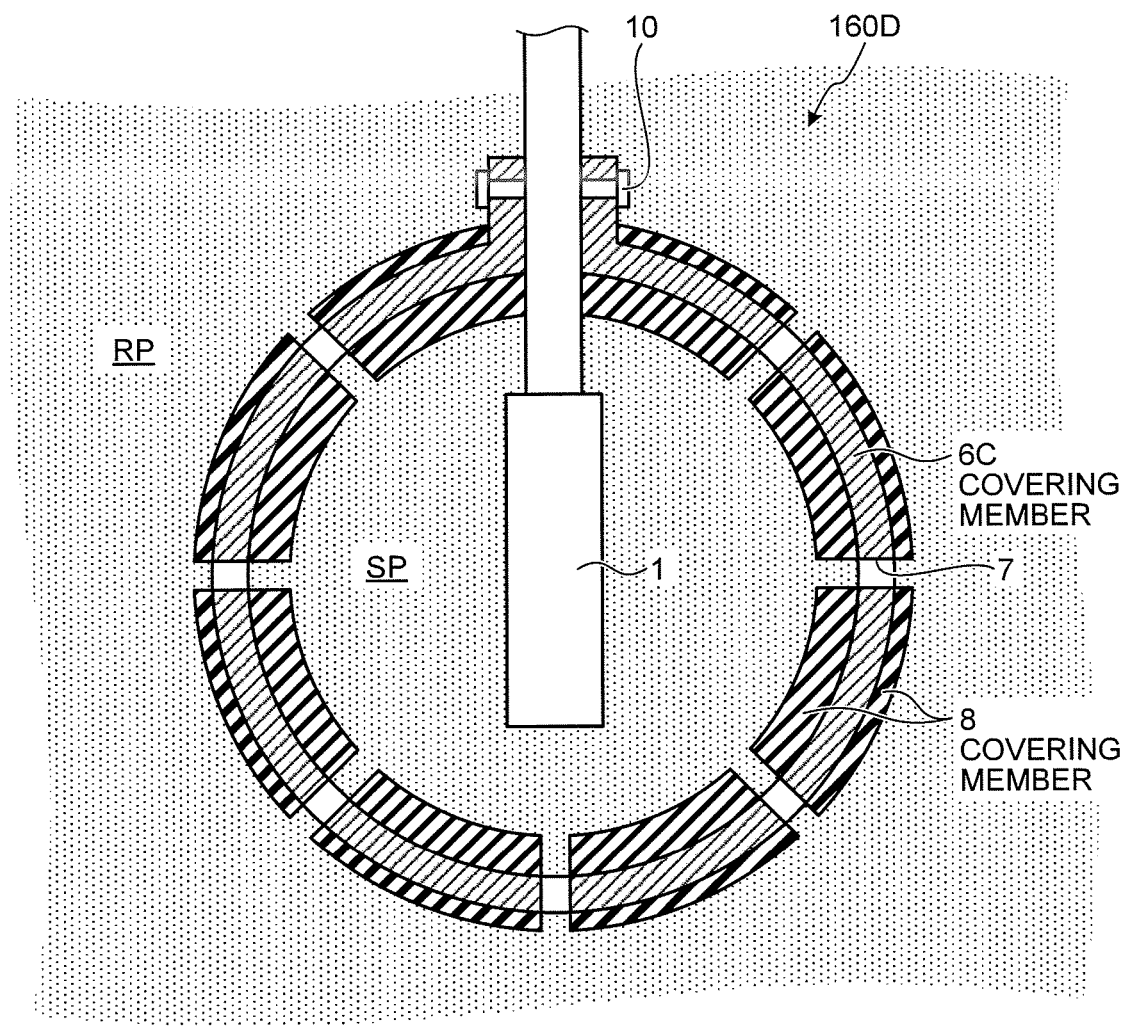
FIG. 21 is a cross section diagram illustrating an example of a water jet peening apparatus according to a sixth embodiment.

FIG. 21 is a cross section diagram illustrating an example of a water jet peening apparatus 160D according to this embodiment. As illustrated in FIG. 21, the water jet peening apparatus 160D includes the covering member 6C, which: is provided to surround the detecting device 1; has the holes 7; and is made of an acrylic resin.

In this embodiment, a covering member 8, which is rubber-made, is arranged to cover an outer surface and an inner surface of the covering member 60, The covering member 8 is arranged on the outer surface and the inner surface of the covering member 6C so as to not block the holes 7. The covering member 8 functions as a sound absorbing member and a protecting member.

In this embodiment, the covering member 6C made of an acrylic resin and the covering member 8 made of rubber are both arranged. By the arrangement of the covering member 8, sound pressure level of sound generated by the jet nozzle 163 is able to be attenuated sufficiently. And also High frequencies band not used is able to be cut smoothly.

As described above, according to this embodiment, since the covering member 8, which is made of rubber, is arranged, sound (sound pressure level) generated by the jet nozzle 163 is able to be attenuated sufficiently and the sound pressure level reaching the detecting device 1 is able to be reduced, and to cut high frequencies band. Therefore, the detecting device 1 is able to detect sound smoothly.

Seventh Embodiment

A seventh embodiment will be described. In the following description, to components that are identical or equivalent to those of the above described embodiments, the same signs will be appended, and description thereof will be simplified or omitted.

Figure 22:
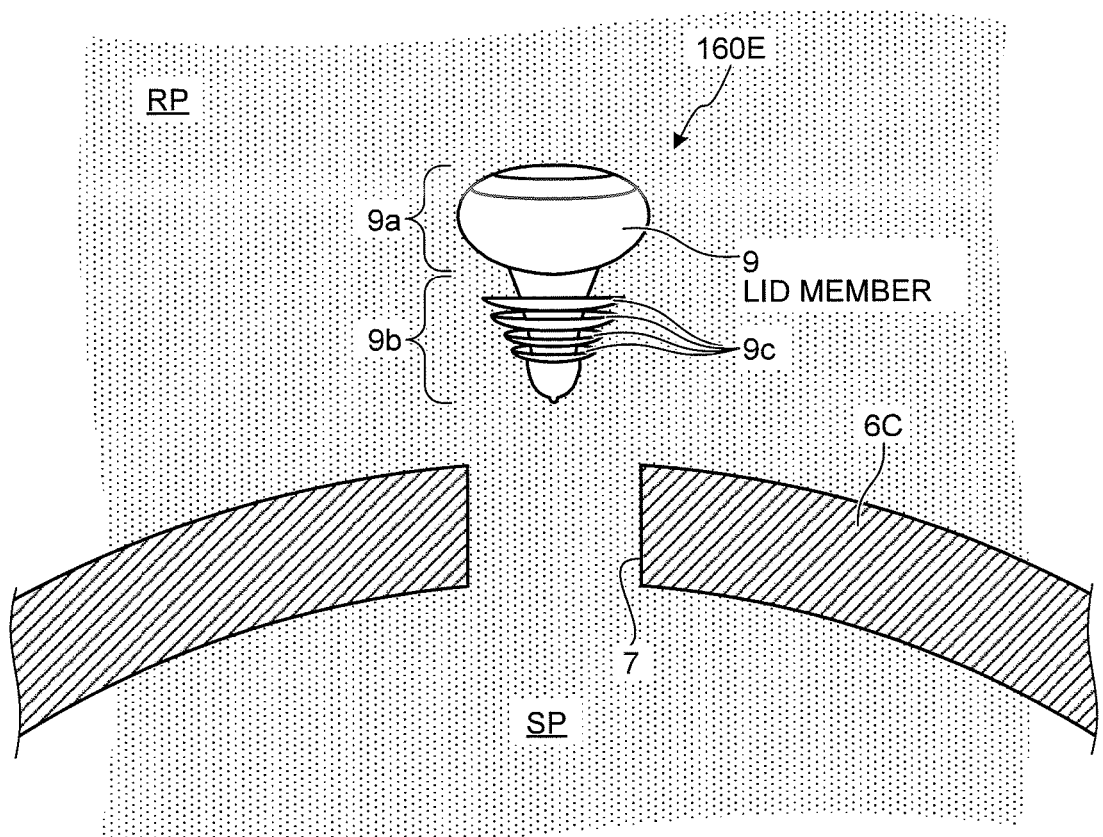
FIG. 22 is a diagram illustrating an example of a water jet peening apparatus according to a seventh embodiment.

FIG. 22 is a cross section diagram illustrating an example of a water jet peening apparatus 160E according to this embodiment. As illustrated in FIG. 22, the water jet peening apparatus 160E includes a lid member 9, which is arranged in the covering member 6C.

For example, by immersing the detecting device 1 and the covering member 6C in water in a state where the holes 7 are not blocked by the lid members 9, water in the external space RP flows into the internal space SP via the holes 7. Thereby, the internal space SP is smoothly filled with water. After the internal space SP is filled with water, the holes 7 are blocked by the lid members 9. Thereby, entrance of bubbles generated by water jet peening into the internal space SP via the holes 7 is suppressed. Approach and contact of the bubbles to and with the detecting device 1 are suppressed, and high frequency bands are cut.

In this embodiment, the lid member 9 is softer than the covering member 6C. In this embodiment, the lid member 9 is made of rubber. The lid member 9 has a large diameter portion 9a, a small diameter portion 9b, and a plurality of flange portions 9c provided in the small diameter portion 9b. As a result, sound generated by the jet nozzle 163 present in the external space RP is able to be transferred to the detecting device 1 present in the internal space SP sufficiently.

In each of the above described embodiments, a target to be processed by water jet peening is assumed to be at least one of the instrumentation nozzle 136 (in-reactor instrumentation tube 145), the groove-welded portion 147, and the bottom head 101e. The target to be processed by water jet peening may be an inlet side nozzle of the nuclear reactor vessel 101 connected to a piping 105b or an outlet side nozzle of the nuclear reactor vessel 101 connected to a piping 105a, like that described with reference to FIG. 1 and FIG. 2.

Further, a target to be processed is not limited to a member of the nuclear reactor vessel 101, and may be, for example, at least a part of: a piping connecting the pressurizer 102 and the steam generator 103; the pressurizer 102; a piping connecting the steam generator 103 and the primary cooling water pump 104; and the steam generator 103.

Further, a target to be processed is not limited to a structure of the nuclear reactor system CS1, and may be a structure of the turbine system CS2. For example, a target to be processed may be at least a part of: a piping connecting the steam generator 103 and the steam turbine 107; the steam turbine 107; the moisture separator and heater 111; the condenser 112; and a piping connecting the condenser 112 and the steam generator 103.

In each of the above described embodiments, a nuclear power plant AP is assumed to include the pressurized water reactor. The nuclear power plant AP may include a boiling water reactor (BWR).

A target to be processed by water jet peening is not limited to a structure of the nuclear power plant AP. Structures of various power plants including thermal power plants and geothermal power plants may be targets to be processed by water jet peening.

REFERENCE SIGNS LIST

1 Detecting device
2 Cable
3 Processing device
4 Storage device
5 Output device
6 Covering member
7 Hole
8 Covering member
9 Lid member
160 Water jet peening apparatus
163 Jet nozzle
163b Mouth
SP Internal space
RP External space

The invention claimed is:
1. A water jet peening apparatus, comprising:
 a nozzle arranged in water and includes a mouth from which water is jetted out;
 a detecting device arranged in the water and detects sound in at least a part of a period during which the water is being jetted out from the mouth;
 a processing device determining presence or absence of abnormality in the nozzle based on a result of the detection by the detecting device; and
 a first covering member disposed on at least a part of region between the detecting device and the nozzle, wherein
 the processing device compares the sound detected by the detecting device to a reference sound obtained beforehand by using the nozzle in a normal state, and determines presence or absence of the abnormality in the nozzle based on a change in a sound pressure level at a predetermined frequency.

2. The water jet peening apparatus according to claim 1, wherein the processing device determines a type of the abnormality based on a frequency of the sound that has changed in sound pressure level thereof.

3. The water jet peening apparatus according to claim 1, wherein the abnormality of the nozzle includes wearing of the nozzle.

4. The water jet peening apparatus according to claim 1, wherein
 an internal space between the first covering member and the detecting device is filled with water.

5. The water jet peening apparatus according to claim 4, wherein the first covering member includes a hole which opens an internal surface of the first covering member and an external surface of the first covering member, and connects the internal space with an external space of the first covering member.

6. The water jet peening apparatus according to claim 5, further comprising:
 a lid member arranged in the hole.

7. The water jet peeing apparatus according to claim 4, further comprising:
 a second covering member that is arranged to cover the external surface and the internal surface of the first covering member and made of rubber.

8. The water jet peening apparatus according to claim 1, wherein
 the nozzle and the detecting device are arranged in the water inside a nuclear reactor vessel,
 the nozzle jets out the water from the mouth at a deepest portion of the nuclear reactor vessel, and
 the detecting device detects sound from an arbitrary water depth including the deepest portion of the nuclear reactor vessel.

9. The water jet peeing apparatus according to claim 1, wherein the first covering member has a spherical shape.

10. The water jet peeing apparatus according to claim 1, wherein
 the processing device determines presence or absence of the abnormality in the nozzle based on a change in the sound pressure level within a predetermined frequency range.

11. A water jet peening method, comprising:
 providing a covering member on at least a part of region between a detecting device and a nozzle;
 jetting out water from a mouth of the nozzle in a state where the mouth and a target to be processed that are arranged in water are opposite to each other;
 detecting sound by a detecting device arranged in the water in at least a part of a period during which the water is being jetted out from the mouth; and determining presence or absence of abnormality in the nozzle based on a result of the detection by the detecting device, wherein the determining step compares the sound detected in the detecting step to a reference sound obtained beforehand by using the nozzle in a normal state, and determines the presence of absence of an abnormality in the nozzle based on a change in a sound pressure level at a predetermined frequency.

12. The water jet peening method according to claim 11, wherein a type of the abnormality is determined based on a frequency of the sound that has changed in sound pressure level thereof.

13. The water jet peening method according to claim 11, wherein the abnormality in the nozzle includes wearing of the nozzle.

14. The water jet peening method according to claim 11, wherein the nozzle and the detecting device are arranged in the water inside a nuclear reactor vessel, the target to be processed includes the nuclear reactor vessel, the nozzle jets out the water from the mouth at a deepest portion of the nuclear reactor vessel, and the detecting device detects sound from an arbitrary water depth including the deepest portion of the nuclear reactor vessel.

15. The water jet peening method according to claim 11, wherein the providing step includes, providing the covering member having a spherical shape.

16. The water jet peening method according to claim 11, further comprising:

filling an internal space between the covering member and the detecting device with water.

17. The water jet peening method according to claim 11, wherein the determining step determines the presence of absence of an abnormality in the nozzle based on a change in the sound pressure level within a predetermined frequency range.

18. A method of evaluating a nozzle of a water jet peening apparatus having a mouth from which water is able to be jetted out, the method comprising:

providing a covering member on at least a part of region between a detecting device and the nozzle;

jetting out water from the mouth of the nozzle in a state where the nozzle is arranged in water;

detecting sound by a detecting device arranged in the water in at least a part of a period during which the water is being jetted out from the mouth; and determining presence or absence of abnormality in the nozzle based on a result of the detection by the detecting device, wherein the determining step compares the sound detected in the detecting step to a reference sound obtained beforehand by using the nozzle in a normal state, and determines the presence or absence of the abnormality in the nozzle based on a change in a sound pressure level at a predetermined frequency.

19. The method of evaluating a nozzle according to claim 18, wherein a type of the abnormality is determined based on a frequency of the sound that has changed in sound pressure level thereof.

20. The method of evaluating a nozzle according to claim 18, wherein the abnormality of the nozzle includes wearing of the nozzle.

21. The method of evaluating a nozzle according to claim 18, wherein the providing step includes, providing the covering member having a spherical shape.

22. The water jet peening method according to claim 18, further comprising:

filling an internal space between the covering member and the detecting device with water.

23. The water jet peening method according to claim 18, wherein the determining step determines the presence of absence of an abnormality in the nozzle based on a change in the sound pressure level within a predetermined frequency range.

* * * * *